(12) United States Patent
Jang et al.

(10) Patent No.: US 12,543,196 B2
(45) Date of Patent: Feb. 3, 2026

(54) METHOD AND DEVICE FOR TRANSMITTING DOWNLINK DATA AS REPEATED DOWNLINK CONTROL INFORMATION IN WIRELESS COMMUNICATION SYSTEM

(71) Applicant: Samsung Electronics Co., Ltd., Gyeonggi-do (KR)

(72) Inventors: Youngrok Jang, Gyeonggi-do (KR); Ameha Tsegaye Abebe, Gyeonggi-do (KR); Seongmok Lim, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 328 days.

(21) Appl. No.: 18/551,676

(22) PCT Filed: Mar. 23, 2022

(86) PCT No.: PCT/KR2022/004043
§ 371 (c)(1),
(2) Date: Sep. 21, 2023

(87) PCT Pub. No.: WO2022/203378
PCT Pub. Date: Sep. 29, 2022

(65) Prior Publication Data
US 2024/0172248 A1      May 23, 2024

(30) Foreign Application Priority Data
Mar. 26, 2021 (KR) .......................... 10-2021-0039677

(51) Int. Cl.
*H04W 72/232* (2023.01)
*H04W 72/0446* (2023.01)
(Continued)

(52) U.S. Cl.
CPC ..... *H04W 72/232* (2023.01); *H04W 72/0446* (2013.01); *H04W 72/1273* (2013.01); *H04W 76/20* (2018.02)

(58) Field of Classification Search
CPC ........... H04W 72/232; H04W 72/0446; H04W 72/1273; H04W 76/20
See application file for complete search history.

(56) References Cited

U.S. PATENT DOCUMENTS

| 10,912,071 B2 | 2/2021 | Panteleev et al. |
| 2019/0149365 A1 | 5/2019 | Chatterjee et al. |

(Continued)

FOREIGN PATENT DOCUMENTS

| KR | 1020210028261 | 3/2021 |
| KR | 10-2022-0053933 | 5/2022 |

OTHER PUBLICATIONS

European Search Report dated May 14, 2024 issued in counterpart application No. 22776078.2-1215, 12 pages.
(Continued)

*Primary Examiner* — Melvin C Marcelo
(74) *Attorney, Agent, or Firm* — The Farrell Law Firm, P.C.

(57) ABSTRACT

The present disclosure relates to a $5^{th}$ generation (5G) or $6^{th}$ generation (6G) communication system for supporting a higher data rate. A method performed by a user equipment (UE) in a wireless communication system is provided. The method may include: receiving, from a base station (BS), a radio resource control (RRC) message including a parameter associated with using a start symbol of a physical downlink control channel (PDCCH) monitoring occasion as a reference of a start and length identifier value (SLIV); determining, based on the parameter, when a physical downlink shared channel (PDSCH) is scheduled by downlink control information (DCI) transmitted via repetitive first PDCCH
(Continued)

candidate and second PDCCH candidate, a reference symbol associated with a start symbol of the PDSCH by using the second PDCCH candidate starting after the first PDCCH candidate; and receiving, based on the reference symbol, downlink data via the PDSCH from the BS.

15 Claims, 22 Drawing Sheets

(51) Int. Cl.
  *H04W 72/1273* (2023.01)
  *H04W 76/20* (2018.01)

(56) References Cited

U.S. PATENT DOCUMENTS

| | | |
|---|---|---|
| 2021/0153228 A1 | 5/2021 | Shi et al. |
| 2022/0131672 A1 | 4/2022 | Jang et al. |
| 2023/0156743 A1* | 5/2023 | Seok ............... H04L 5/0094 370/329 |

OTHER PUBLICATIONS

PCT/ISA/210, International Search Report dated Jun. 30, 2022 issued in counterpart application No. PCT/KR2022/004043, 5 pages.
PCT/ISA/237, Written Opinion dated Jun. 30, 2022 issued in counterpart application No. PCT/KR2022/004043, 3 pages.
Qualcomm, "Discussion Summary for mTRP PDCCH Reliability Enhancements", 3GPP TSG-RAN WG1 Meeting #104-e R1-2101838 e-Meeting, Jan. 25-Feb. 5, 2021, pp. 51.
Huawei, HiSilicon, "Enhancements on multi-TRP for reliability and robustness in Rel-17", 3GPP TSG RAN WG1 Meeting #104-e R1-2100209 E-meeting, Jan. 25-Feb. 5, 2021, pp. 16.
Qualcomm Incorporated, "Enhancements on Multi-TRP for PDCCH, PUCCH and PUSCH", 3GPP TSG-RAN WG1 Meeting #104-e R1-2101447 e-Meeting, Jan. 25-Feb. 5, 2021, pp. 30.
Ericsson, "On PDCCH, PUCCH and PUSCH enhancements", 3GPP TSG-RAN WG1 Meeting #104e R1-2101654 Jan. 26-Feb. 12, 2021, pp. 25.

* cited by examiner

| | R | SERVING CELL ID | | | | | BWP ID | | Oct 1 |
|---|---|---|---|---|---|---|---|---|---|
| | $T_7$ | $T_6$ | $T_5$ | $T_4$ | $T_3$ | $T_2$ | $T_1$ | $T_0$ | Oct 2 |
| 750 | $T_{15}$ | $T_{14}$ | $T_{13}$ | $T_{12}$ | $T_{11}$ | $T_{10}$ | $T_9$ | $T_8$ | Oct 3 |
| | $T_{(N-2) \times 8+7}$ | $T_{(N-2) \times 8+6}$ | $T_{(N-2) \times 8+5}$ | $T_{(N-2) \times 8+4}$ | $T_{(N-2) \times 8+3}$ | $T_{(N-2) \times 8+2}$ | $T_{(N-2) \times 8+1}$ | $T_{(N-2) \times 8}$ | Oct N |

METHOD AND DEVICE FOR TRANSMITTING DOWNLINK DATA AS REPEATED DOWNLINK CONTROL INFORMATION IN WIRELESS COMMUNICATION SYSTEM

PRIORITY

This application is a National Phase Entry of PCT International Application No. PCT/KR2022/004043, which was filed on Mar. 23, 2022, and claims priority to Korean Patent Application No. 10-2021-0039677, which was filed on Mar. 26, 2021, the entire content of each of which is incorporated herein by reference.

TECHNICAL FIELD

The present disclosure relates to a field of $5^{th}$ generation (5G) communication networks, and more particularly, to rules for mapping a physical downlink shared channel (PDSCH) when repetitive transmission of downlink control information (DCI) in a physical downlink control channel (PDCCH) schedules the PDSCH.

BACKGROUND ART

A $5^{th}$ generation (5G) mobile communication technology defines a broad frequency band to enable a high date rate and new services, and may be implemented not only in a 'Sub 6 GHz' band including 3.5 GHz but also in an ultra high frequency band ('Above 6 GHz') referred to as millimeter wave (mmWave) including 28 GHz, 39 GHz, and the like. Also, for a $6^{th}$ generation (6G) mobile communication technology referred to as a system beyond 5G communication (beyond 5G), in order to achieve a data rate fifty times faster than the 5G mobile communication technology and ultra-low latency one-tenth of the 5G mobile communication technology, implementation of the 6G mobile communication technology in the terahertz band (e.g., the 95 GHz to 3 THz band) is being considered.

In the early phase of the development of the 5G mobile communication technology, in order to support services and satisfy performance requirements of enhanced Mobile BroadBand (eMBB), Ultra Reliable Low Latency Communications (URLLC), and massive Machine-Type Communications (mMTC), there has been ongoing standardization about beamforming and massive multiple input multiple output (MIMO) for mitigating pathloss of radio waves and increasing transmission distances of radio wave in a mmWave band, supporting numerologies (for example, operation of multiple subcarrier spacings) for efficiently utilizing mmWave resources and dynamic operation of slot formats, initial access technologies for supporting multi-beam transmission and broadband, definition and operation of bandwidth part (BWP), new channel coding methods such as a low density parity check (LDPC) code for a large amount of data transmission and a polar code for highly reliable transmission of control information, L2 pre-processing, and network slicing for providing a dedicated network specialized to a specific service.

Currently, there are ongoing discussions about improvement and performance enhancement of initial 5G mobile communication technologies in consideration of services to be supported by the 5G mobile communication technology, and there has been physical layer standardization of technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) that is UE-satellite direct communication for providing coverage in an area in which communication with terrestrial networks is unavailable, and positioning.

Moreover, there has been ongoing standardization of air interface architecture/protocol regarding technologies such as industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR), and standardization of system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

When the 5G mobile communication system is commercialized, connected devices being on a rapidly increasing trend are being predicted to be connected to communication networks, and therefore, it is predicted that enhancement of functions and performance of the 5G mobile communication system and integrated operations of the connected devices are required. To this end, new researches are scheduled for extended Reality (XR) for efficiently supporting Augmented Reality (AR), Virtual Reality (VR), Mixed Reality (MR) and the like, 5G performance improvement and complexity reduction by utilizing artificial intelligence (AI) and machine learning (ML), AI service support, metaverse service support, drone communication, and the like.

Also, such development of the 5G mobile communication system will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of the 6G mobile communication technologies and improving system networks, AI-based communication technology for implementing system optimization by utilizing satellites and AI from a design stage and internalizing end-to-end AI support functions, and next-generation distributed computing technology for implementing services at levels of complexity exceeding the limit of UE operation capability by utilizing ultra-high-performance communication and computing resources.

DISCLOSURE

Technical Solution

The present disclosure provides methods and an apparatus for a communication network to configure a reference start symbol for scheduling and receiving physical downlink shared channel (PDSCH) transmission scheduled by repetitive transmission of scheduling downlink control information (DCI), wherein the communication network is at least one of a 5$^{th}$ generation (5G) standalone network and a 5G non-standalone (NSA) network.

The present disclosure provides methods and systems for mapping a demodulation reference signal (DM-RS) for a PDSCH under a condition at which the PDSCH is scheduled by repetitive DCI.

DESCRIPTION OF DRAWINGS

Embodiments in the present disclosure are illustrated in the accompanying drawings, and throughout the drawings, like reference letters refer to corresponding parts in various drawings. The embodiments in the present disclosure will be more fully understood from the following descriptions with reference to the drawings, in which.

MODE FOR INVENTION

Figure 1:
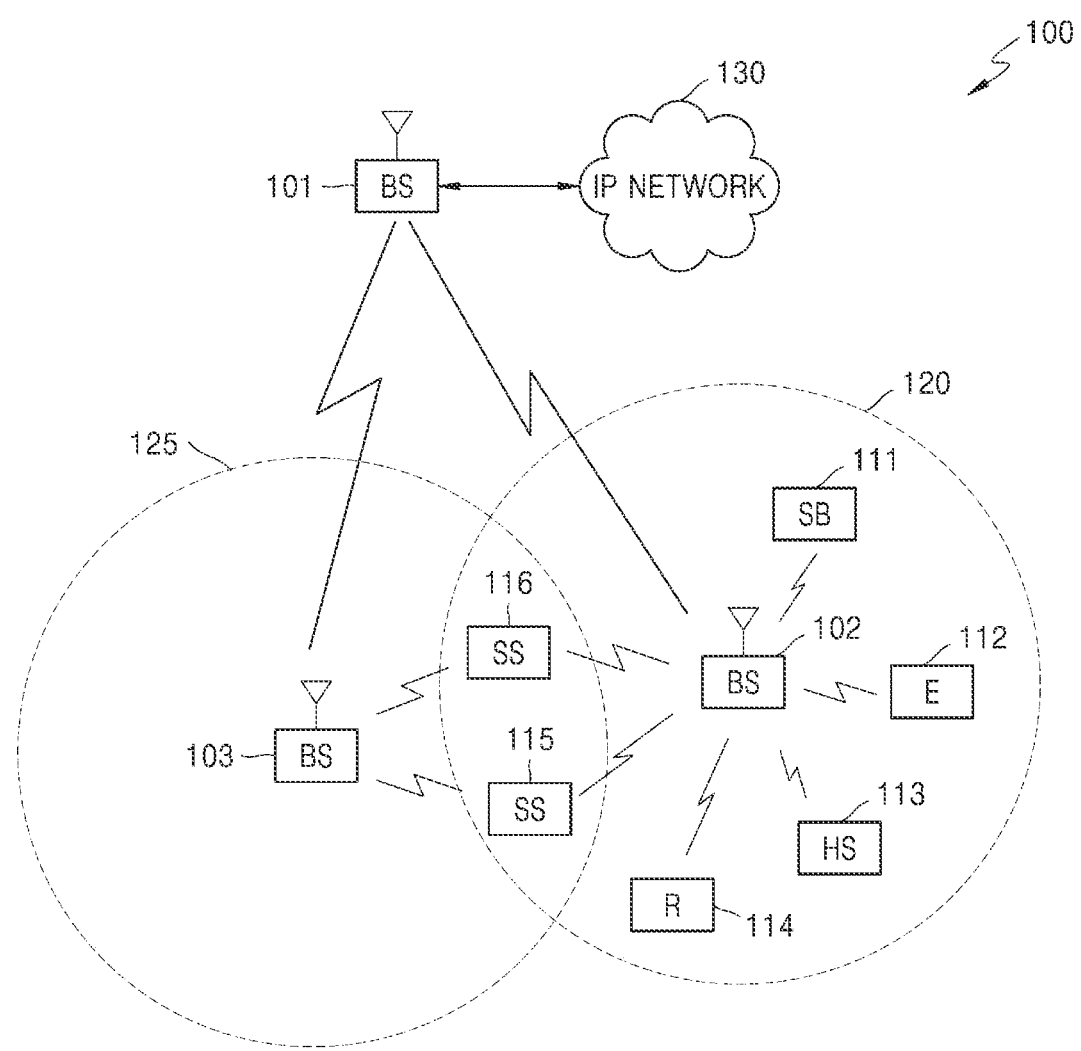
FIG. 1 illustrates an exemplary wireless network 100 according to the present disclosure.

Before describing "Mode for Invention", it may be efficient to define specific terms and phrases used throughout the present specification: the terms "comprise" and "include", as well as the derivatives thereof, denote unlimited inclusion; the term "or" is inclusive and denote "and/or"; not only the phase "associated with", but also the derivatives thereof denote "include", "included in", "interconnected to", "contain", "contained in", "connect or connected to", "couple or coupled to", "able to communicate with", "cooperate with", "interpose", "juxtaposed with", "approach", "bound to", "have", or "have a feature of"; and the term "controller" denotes any device, system or part thereof for controlling at least one operation, and the device may be implemented as hardware, firmware, or software, or a combination of at least two of them. It should be noted that the functionality associated with any specific controller may be centralized or distributed, whether locally or remotely.

Moreover, various functions to be described below may be implemented or supported by one or more computer programs, and each of the computer programs is formed from computer-readable program codes and is included in a computer-readable medium. The terms "application" and "program" may refer to one or more computer programs, software components, instruction sets, procedures, functions, objects, classes, instances, associated data, or part thereof, which are appropriately implemented in computer-readable program codes. The phrase "computer-readable program codes" includes various types of computer codes including source codes, target codes and executable codes. The phrase "computer-readable medium" includes various types of medium accessible by a computer, such as a read-only memory (ROM), a random-access memory (RAM), a hard disk drive, a compact disc (CD), a digital video disc (DVD) or other various types of memory. A "non-transitory" computer-readable medium excludes wired, wireless, optical, or other communication links via which temporary electrical or other signals are transmitted. The non-transitory computer-readable medium includes a medium for permanently storing data, and a medium for storing data which can be overwritten afterward, i.e., a rewritable optical disk or an erasable memory device.

Definitions for specific words and phrases are provided throughout this patent document, those of ordinary skill in the art should understand that in many, if not most instances, such definitions apply to prior, as well as future uses of such defined words and phrases.

FIGS. 1 to 18 to be discussed below and various embodiments used to describe the principles of the present disclosure in this patent document are merely examples and should not be construed as limiting the scope of the present disclosure. Those of ordinary skill in the art will understand that the principles of the present disclosure may be implemented in any appropriately arranged system or device.

Hereinafter, embodiments of the present disclosure will now be described more fully with reference to the accompanying drawings. Detailed explanations of the related art which are related to the present disclosure are omitted when it is deemed that they may unnecessarily obscure the essence of the present disclosure. Moreover, the technical terms used herein are defined in consideration of functions used in the present disclosure, and may be changed according to the intent or known methods of users and operators. Accordingly, definitions of the terms should be understood based on the entire description of the present specification.

Advantages and features of the present disclosure and methods of accomplishing the same may be understood more readily by reference to the following detailed descriptions of embodiments and accompanying drawings of the present disclosure. However, the present disclosure may be embodied in many different forms and should not be construed as being limited to the embodiments set forth herein. The embodiments are provided so that the present disclosure will be thorough and complete and will fully convey the concept of the present disclosure to one of ordinary skill in the art. Therefore, the present disclosure will be defined by the appended claims. Throughout the specification, like reference numerals denote like elements.

Hereinafter, embodiments of the present disclosure will now be described more fully with reference to the accompanying drawings.

In the descriptions of embodiments, certain detailed explanations of the related art which are well known in the art to which the present disclosure belongs and are not directly related to the present disclosure are omitted. By omitting unnecessary explanations, the essence of the present disclosure may not be obscured and may be explicitly conveyed.

For the same reason, some components in the drawings are exaggerated, omitted, or schematically illustrated. Also, the size of each component does not entirely reflect the actual size. In the drawings, the same or corresponding components are denoted by the same reference numerals.

Advantages and features of the present disclosure and methods of accomplishing the same may be understood more readily by reference to the following detailed descriptions of embodiments and accompanying drawings of the present disclosure. However, the present disclosure may be embodied in many different forms and should not be construed as being limited to the embodiments set forth herein. The embodiments are provided so that the present disclosure will be thorough and complete and will fully convey the concept of the present disclosure to one of ordinary skill in the art. Therefore, the present disclosure will be defined by the appended claims. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or may sometimes be executed in the reverse order, depending upon the functionality involved.

Here, the term "unit" as used in an embodiment refers to a software or hardware component, such as field-programmable gate array (FPGA) or application-specific integrated circuit (ASIC), which performs certain tasks. However, the meaning of the "unit" is not limited to software or hardware. The "unit" may be configured to be in an addressable storage medium or configured to operate one or more processors. Thus, for example, the "unit" may include components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented to replicate one or more central processing units (CPUs) in a device or a secure multimedia card. Also, in some embodiments, the "unit" may include one or more processors.

Wireless communication is one of the most-successful innovations in modern history. Recently, the number of subscribers to wireless communication services exceeds 5 billions and rapidly increases. The demand for wireless data traffic sharply increases as smart phones and other mobile data devices such as tablets, "note pad" computers, net books, e-book readers, and machine-type devices become popular among consumers and in the business world. In order to meet the high growth of mobile data traffic and support distribution of new applications and distributions, it is most important to enhance coverage and efficiency of a radio interface.

5$^{th}$ generation (5G) communication systems have been developed and are currently distributed to meet the ever-increasing demand for wireless data traffic since distribution of 4$^{th}$ generation (4G) communication systems and enable various vertical application programs.

The 5G communication system is implemented in higher frequency (millimeter wave (mmwave)) bands, e.g., 28 GHz or 60 GHz, or bands above 6 GHz to achieve higher data rates, or in lower frequency bands, e.g., below 6 GHz, so as to enable robust coverage and mobility support. Embodiments of the present disclosure may be applied to the 5 communication systems, 6G, or further, future releases that use Tera Hertz (THz). In order to reduce the propagation loss of radio waves and increase the transmission range, beamforming, massive multiple input multiple output (MIMO), full dimensional (FD) MIMO, array antenna, analog beamforming, and massive antenna schemes are discussed in 5G communication systems.

Also, in the 5G communication system, next-generation small cells, cloud radio access networks (RANs), ultra-dense networks, device-to-device (D2D) communication, wireless backhaul, a moving network, cooperative communication, coordinated multi-points (COMP), interference cancellation at a receiving end, and the like are being developed for network enhancement of the system. In the 5G system, a support for various services is considered, compared to the existing 4G system. For example, the most representative services are an enhanced mobile broadband (eMBB) communication service, an ultra-reliable and low-latency communication (URLLC) service, a massive machine type communication (mMTC) service, an evolved multimedia broadcast/multicast service (eMBMS), or the like. Moreover, a system providing the URLLC service may be referred to as an URLLC system, a system providing the eMBB service may be referred to as an eMBB system, and the like. In addition, the terms "service" and "system" may be interchangeably used with each other.

As described above, in a communication system, a plurality of services may be provided to a user. In order to provide a plurality of such services to a user, there is a need for a method capable of providing each service appropriate for features within the same time interval and a device using the same.

In a wireless communication system, for example, in a long term evolution (LTE) system, an LTE-advanced (LTE-A) system or a 5G new radio (NR) system, a base station (BS) and a user equipment (UE) may be configured such that the BS transmits downlink control information (DCI) to the UE, the DCI including resource allocation information for transmission of a downlink signal to be transmitted via a physical downlink control channel (PDCCH), and thus the UE receives at least one downlink signal of the DCI (for example, a channel-state information reference signal (CSI-RS)), a physical broadcast channel (PBCH), or a physical downlink shared channel (PDSCH). For example, the BS transmits, in a subframe n, DCI indicating, to the UE, reception of the PDSCH in the subframe n via the PDCCH, and when receiving the DCI, the UE receives the PDSCH in the subframe according to the received DCI. In addition, in the LTE, LTE-A, or NR system, the BS and the UE may be configured such that the BS transmits DCI including uplink resource allocation information to the UE via the PDCCH, and thus the UE transmits at least one uplink signal of uplink control information (UCI) (for example, a sounding reference signal (SRS), UCI, or a physical random access channel (PRACH)) or a physical uplink shared channel (PUSCH) to the BS. For example, the UE that has received uplink transmission configuration information (or uplink DCI or UL grant) in a subframe n from the BS via the PDCCH may perform uplink data channel transmission (hereinafter, referred to as "PUSCH transmission") according to a pre-defined time (for example, n+4), a time configured via a higher-layer signal (for example, n+k), or uplink signal transmission time indicator information included in the uplink transmission configuration information.

In a case where configured downlink transmission is transmitted from the BS to the UE via an unlicensed band, or configured uplink transmission is transmitted from the UE to the BS via the unlicensed band, a transmission device (the BS or the UE) may perform a channel access procedure or listen-before talk (LBT) procedure on the unlicensed band where a signal transmission is configured before or immediately before a start of the configured signal transmission. According to a result of performing the channel access procedure, when it is determined that the unlicensed band is in an idle state, the transmission device may access the unlicensed band and then may perform the configured signal transmission. According to the result of the channel access procedure performed by the transmission device, when it is determined that the unlicensed band is not in the idle state or that the unlicensed band is in an occupied state, the transmission device fails to access the unlicensed band and thus fails to perform the configured signal transmission. In general, in the channel access procedure where signal transmission is configured via the unlicensed band, the transmission device may determine the idle state of the unlicensed band by receiving a signal via the unlicensed band during a predetermined time or a time calculated according to a pre-defined rule (for example, a time calculated using a random value selected by the BS or the UE), and comparing a strength of the received signal with a threshold value that is pre-defined or calculated by using a function of at least one parameter including a channel bandwidth, a bandwidth of a signal to be transmitted, the intensity of transmission power, or a beamwidth of a transmission signal. For example, when a strength of a signal received by the transmission device for 25 microseconds (μs) is less than −72 dBm, that is, the pre-defined threshold, the transmission device may determine that the unlicensed band is in the idle state and thus may perform the configured signal transmission. In this case, a maximum available time of the signal transmission may be limited according to a maximum channel occupancy time in the unlicensed band, which is defined according to each country or each region, or a type (for example, the BS, the UE, a master device or a slave device) of the transmission device. For example, in Japan, the BS or the UE in 5 GHz of the unlicensed band may perform the channel access procedure and then may transmit, during a maximum of 4 milliseconds (ms), a signal by occupying a channel without additionally performing the channel access procedure. When the strength of the signal received for 25 us is greater than −72 dBm that is the pre-defined threshold, the BS may determine that the unlicensed band is not in the idle state and does not transmit a signal.

In the 5G communication system, in order to provide various services and support a high data transmission rate, various technologies such as a technology capable of performing re-transmission in units of code block groups and transmitting an uplink signal without UL scheduling information have been introduced. Accordingly, in order to perform 5G communication via the unlicensed band, a more efficient channel access procedure based on various parameters is required.

Wireless communication systems that provided voice-based services in the early stages are now being developed to be broadband wireless communication systems providing high-speed and high-quality packet data services according to communication standards such as high speed packet access (HSPA), LTE or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE). In addition, 5G or NR communication standards are being established for a 5G wireless communication system.

In a wireless communication system including the 5G system, at least one of services including eMBB, mMTC, and URLLC may be provided to a UE. The services may be provided to a same UE during a same time interval. In an embodiment, the eMBB may be a service aiming at high-speed transmission of large-capacity data, the mMTC may be a service aiming at minimizing UE power and connecting a plurality of UEs, and the URLLC may be a service aiming at high reliability and low latency, but the present disclosure is not limited thereto. The above three services may be major scenarios in a system such as an LTE system or a 5G or new-radio/next-radio (NR) system after LTE.

In a case where a BS has scheduled data corresponding to an eMBB service for a UE in a particular transmission time interval (TTI), when a situation in which URLLC data is to be transmitted in the TTI occurs, the BS does not transmit some of eMBB data in a frequency band in which the eMBB data has already been scheduled and transmitted, but may transmit the generated URLLC data in the frequency band. A UE for which the eMBB has been scheduled and a UE for which URLLC has been scheduled may be the same UE or different UEs. In this case, a possibility of an increase in damage to the eMBB data may mean that a portion of the eMBB data that is already scheduled and transmitted is not transmitted. Accordingly, in the above case, there is a need for a method of processing a signal received by the UE for which eMBB has been scheduled or the UE for which URLLC has been scheduled and a method of receiving a signal.

Hereinafter, the present disclosure will now be described in detail with reference to the accompanying drawings. Detailed explanations of the related art which are related to the present disclosure are omitted when it is deemed that they may unnecessarily obscure the essence of the present disclosure. Moreover, in the description of the present disclosure, the technical terms used herein are defined in consideration of functions used in the present disclosure, and may be changed according to the intent or known methods of users and operators. Accordingly, definitions of the terms should be understood based on the entire description of the present specification.

Hereinafter, a BS is an entity that allocates resources to a UE, and may be at least one of a next-generation node B (gNode B), an evolved node B (eNode B), a Node B, a base station (BS), a radio access unit, a BS controller, and a node on a network. A terminal may be interchangeably used with a user equipment (UE), a mobile station (MS), a cellular phone, a smartphone, a computer, or a multimedia system, which is capable of performing a communication function. In the present disclosure, a downlink (DL) is a wireless transmission path of a signal transmitted from a BS to a UE, and an uplink (UL) is a wireless transmission path of a signal transmitted from a UE to a BS. Moreover, hereinafter, an LTE or LTE-A system is described as an example in the present disclosure but the present disclosure is not limited thereto and thus, embodiments of the present disclosure may be applied to other communication systems having similar technical backgrounds or channel types, and for example, a 5G mobile communication technology (5G or NR) developed after LTE-A may be included in the present disclosure. Furthermore, an embodiment of the present disclosure is applicable to other communication systems through modification at the discretion of one of ordinary skill in the art without greatly departing from the scope of the present disclosure.

As a representative example of broadband wireless communication systems, the NR system has adopted an orthogonal frequency division multiplexing (OFDM) scheme in a DL and has adopted OFDM and a single carrier frequency division multiple access (SC-FDMA) scheme in an UL. A UL refers to a wireless link via which data or a control signal is transmitted from a terminal (a UE or an MS) to a base station (an eNode B or a BS), and a DL refers to a wireless link via which data or a control signal is transmitted from a base station to a terminal. The multiple access schemes described above identify data or control information of different users in a manner that time-frequency resources for carrying the data or control information of the users are allocated or managed not to overlap each other, that is, to achieve orthogonality therebetween.

Descriptions of embodiments are provided in pages below.

Texts and drawings are only provided for readers to understand the present disclosure. They should be neither intended nor interpreted as arbitrarily limiting the scope of the present disclosure. While specific embodiments and examples are provided, one of ordinary skill in the art may understand, based on the present disclosure, that the embodiments and the examples may be modified without departing from the scope of the present disclosure.

Flowcharts below illustrate exemplary methods that may be implemented according to principles of the present disclosure, and various modifications may be implemented with respect to methods shown in the flowcharts of the present disclosure. For example, various steps shown in succession in each of drawings may be executed concurrently or in parallel or in different order or multiple times. As another example, steps may be omitted or replaced by other steps.

The present disclosure is proposed to solve the aforementioned problems and disadvantages and to provide advantages described below.

According to an aspect of the present disclosure, a method performed by a UE in a wireless communication system is provided. The method includes receiving, from a BS, time domain resource allocation (TDRA) information on a PDSCH, wherein the TDRA information includes a parameter associated with an availability of a start reference symbol with respect to the PDSCH from first DCI. When the TDRA information does not exist, a default method for configuring the start reference symbol with respect to the PDSCH is provided.

According to another aspect of the present disclosure, a method performed by a BS in a wireless communication system is provided, the method including transmitting, to a UE, configuration information about a start reference symbol about a PDSCH, wherein the method may further include an additional demodulation reference signal (DM-RS) shifting rule, according to the start reference symbol about the PDSCH.

According to another aspect of the present disclosure, a UE for receiving data in a wireless communication system is provided. The UE may include a transceiver, and a controller coupled with the transceiver and configured to receive, from a BS, configuration information about a start reference symbol about a PDSCH, and the method may include an additional DMRS shifting rule, according to the start reference symbol about the PDSCH.

According to another aspect of the present disclosure, a BS for transmitting data in a wireless communication system is provided. The BS may include a transceiver, and a controller coupled with the transceiver and configured to transmit, from a UE, configuration information about a start reference symbol about a PDSCH, and the method may include an additional DMRS shifting rule, according to the start reference symbol about the PDSCH.

According to another aspect of the present disclosure, a BS for transmitting a downlink reference signal (DM-RS) when a PDSCH is scheduled by one or more DCIs is provided.

According to another aspect of the present disclosure, a UE for receiving a downlink reference signal (DM-RS) when a PDSCH is scheduled by one or more DCIs is provided.

FIG. 1 illustrates an exemplary wireless network 100 according to the present disclosure. An embodiment of the wireless network 100 shown in FIG. 1 is merely an example. Other embodiments of the wireless network 100 may be used without departing from the scope of the present disclosure.

The wireless network 100 includes a gNodeB (gNB) 101, a gNB 102, and a gNB 103. The gNB 101 communicates with the gNB 102 and the gNB 103. The gNB 101 also communicates with at least one internet protocol (IP) network 130 such as Internet, a dedicated IP network, or other data network.

Based on a type of a network, the term 'gNB' may refer to various components (or a collection of components) configured to provide remote UEs with radio access to the network, such as a BS transceiver, a wireless BS, a transmit point (TP), a transmit-receive point (TRP), a ground gateway, an airborne gNB, a satellite system, a mobile BS, a macrocell, a femtocell, a wireless fidelity (Wi-Fi) access point (AP), etc. Furthermore, based on the type of the network, various well-known terms such as "mobile station", "subscriber station", "remote UE", "wireless UE", or "user device" may be used instead of the term "user equipment" or "UE". For convenience, the terms "user equipment" and "UE" are used in this patent document to indicate a device that wirelessly accesses a gNB. The UE may be a mobile device or a stationary device. For example, the UE may be a mobile phone, a smartphone, a monitoring device, an alarming device, a fleet management device, an asset tracking device, a vehicle, a desktop computer, an entertainment device, an infotainment device, a vending machine, an electricity meter, a water meter, a gas meter, a security device, a sensor device, a home appliance, etc.

The gNB 102 provides wireless broadband access to the network 130 for a plurality of first UEs in a coverage area 120 of the gNB 102. The plurality of first UEs include a UE 111 that may be located in a small business (SB); a UE 112 that may be located in an enterprise (E); a UE 113 that may be located in a Wi-Fi hotspot (HS); a UE 114 that may be located in a first residence (R); a UE 115 that may be located in a second residence (R); and a UE 116 that may be a mobile device (M) including a cellphone, a wireless laptop, a wireless personal digital assistant (PDA), or the like. The gNB 103 provides wireless broadband access to the network 130 for a plurality of second UEs in a coverage area 125 of the gNB 103. The plurality of second UEs include the UE 115 and the UE 116. In some embodiments, one or more gNBs from among the gNBs 101 to 103 may use 5G, LTE, LTE-A, WiMAX or other advanced wireless communication schemes to communicate with each other and communicate with the UEs 111 to 116.

Broken lines indicate approximate ranges of the coverage areas 120 and 125, and the coverage areas are shown in circles only for illustration and descriptions. It should be understood that coverage areas associated with gNBs, for example, the coverage areas 120 and 125, may have various forms including irregular forms depending on the configuration of each gNB and a change in wireless environment associated with natural and artificial obstacles.

As will be further described below, one or more of the BS 101, the BS 102 and the BS 103 include two-dimensional (2D) antenna arrays as described in embodiments of the present disclosure. In some embodiments, one or more of the BS 101, the BS 102 and the BS 103 support a codebook design and structure for systems having 2D antenna arrays.

While FIG. 1 illustrates an example of the wireless network 100, various modifications may be made to FIG. 1. For example, the wireless network 100 may include an arbitrary number of gNBs and an arbitrary number of UEs in various layouts. Furthermore, the gNB 101 may directly communicate with the arbitrary number of UEs and may provide the UEs with wireless broadband access to the network 130. Equally, each of the gNBs 102 and 103 may also directly communicate with the network 130 and may provide wireless broadband access to the IP network 130 for the connected UEs. Moreover, the gNBs 101, 102, and/or 103 may also provide access to other or additional external networks, e.g., external phone networks or different type of data network or data networks with different types.

Figure 2A:
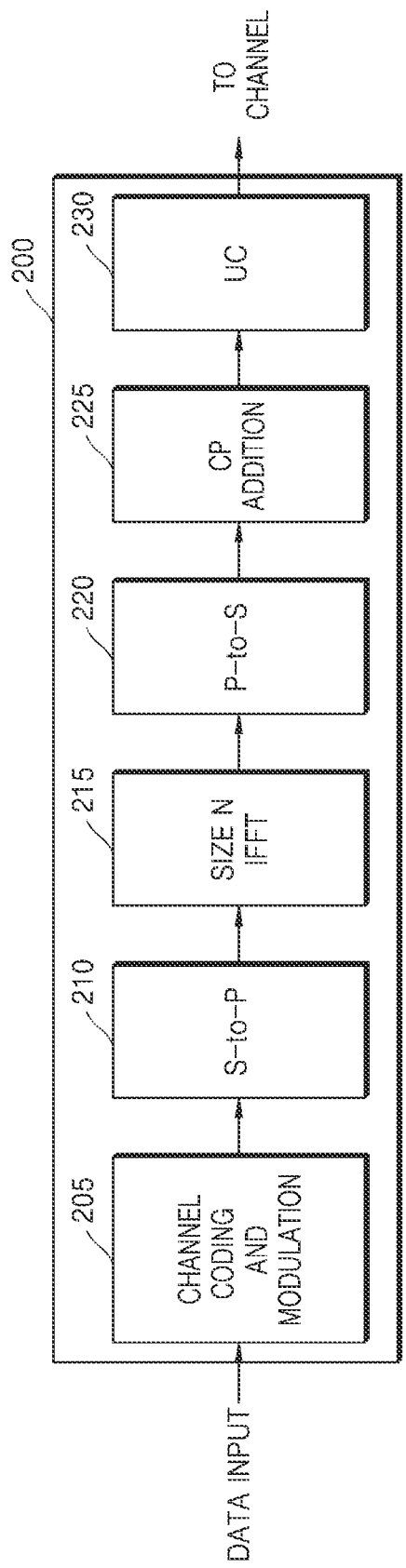
FIGS. 2A and 2B illustrate exemplary wireless transmission and reception paths according to the present disclosure.
Figure 2B:
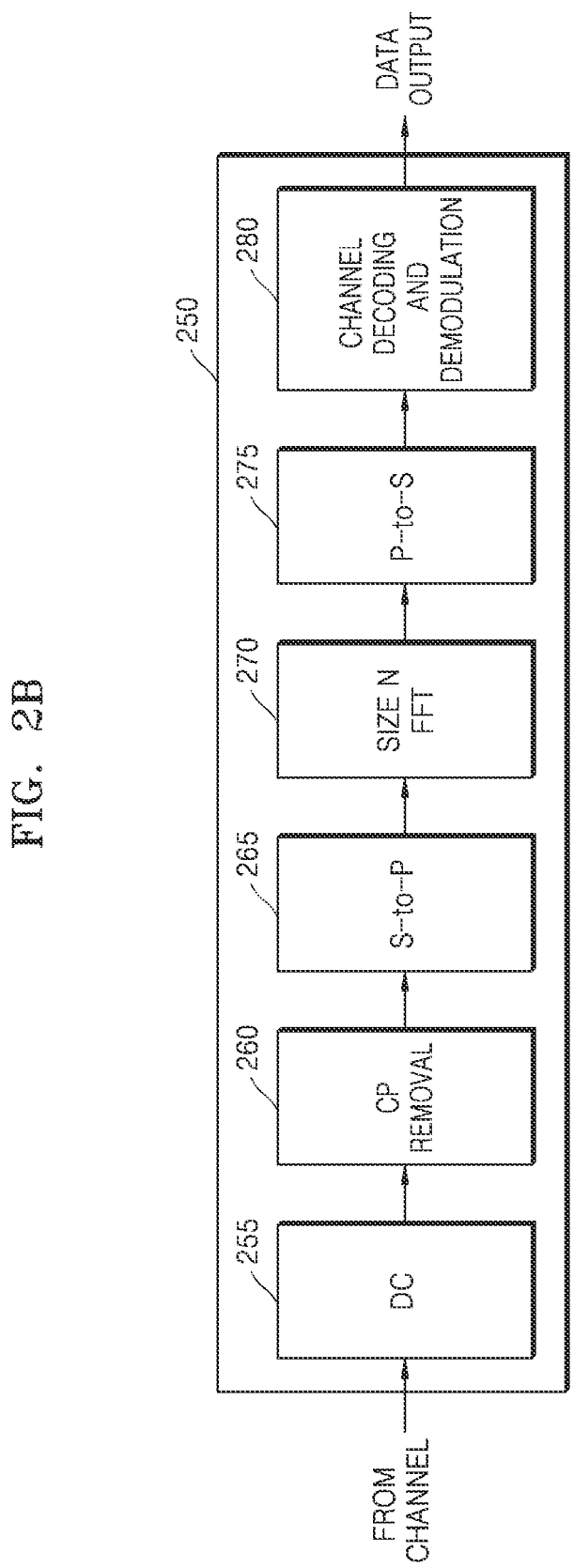

FIGS. 2A and 2B illustrate exemplary wireless transmission and reception paths according to the present disclosure. In the descriptions below, it may be described that a transmission path 200 is implemented in a gNB (e.g., the gNB 102) whereas a reception path 250 is implemented in a UE (e.g., the UE 116). However, it may be understandable that the reception path 250 may be implemented in the gNB and the transmission path 200 may be implemented in the UE. In some embodiments, the reception path 250 is configured to support a codebook design and structure for a system including 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix (CP) addition block 225, and an up-converter (UC) 230. The reception path 250 includes a down-converter (DC) 255, a CP removal block 260, a S-to-P block 265, a size N fast Fourier transform (FFT) block 270, a P-to-S block 275, and a channel decoding and demodulation block 280.

In the transmission path 200, the channel coding and modulation block 205 receives an information bit set, applies coding (e.g., low-density parity check (LDPC) coding) and modulates (e.g., quadrature phase shift keying (QPSK) or quadrature amplitude modulation (QAM)) the input bits to generate a sequence of frequency domain modulation symbols. The S-to-P block 210 converts (e.g., demultiplex) the serially modulated symbols to parallel data so as to generate N parallel symbol streams, and in this regard, N is a size of IFFT/FFT used by the gNB 102 and the UE 116. Then, the size N IFFT block 215 performs an IFFT operation on the N parallel symbol streams, thereby generating time domain output signals. The P-to-S block 220 converts (e.g., multiplex) the parallel time domain output symbols from the size N IFFT block 215 so as to generate a serial time domain signal. The CP addition block 225 inserts a CP to the time domain signal. The UC 230 converts an output of the CP addition block 225 into a radio frequency (RF) frequency (e.g., up conversion) for transmission via a wireless channel. The signal may be filtered in a baseband before being converted into the RF frequency.

When an RF signal transmitted from the gNB 102 arrives at the UE 116 via the wireless channel, the UE 116 performs reverse-operations performed by the gNB 102. The DC 255 down-converts the received signal into a baseband frequency, and the CP removal block 260 generates a serial time domain baseband signal by removing the CP. The S-to-P block 265 converts the time domain baseband signal to parallel time domain signals. The size N FFT block 270 generates N parallel frequency domain signals by performing an FFT algorithm. The P-to-S block 275 converts the parallel frequency domain signals to a sequence of modulated data symbols. The channel decoding and demodulation block 280 demodulates and then decodes the modulated symbols to recover the original input data stream.

Each of the gNBs 101 to 103 may implement the transmission path 200 similar to transmission to the UEs 111 to 116 via a DL, and may implement the reception path 250 similar to reception from the UEs 111 to 116 via a UL. Equally, each of the UEs 111 to 116 may implement the transmission path 200 for transmission to the gNBs 101 to 103 via a UL, and may implement the reception path 250 for reception from the gNBs 101 to 103 via a DL.

The respective components shown in FIGS. 2A and 2B may be implemented in hardware only or a combination of hardware and software/firmware. In a specific embodiment, at least some components from among the components in FIGS. 2A and 2B may be implemented in software and the other components may be implemented in configurable hardware or a combination of software and configurable hardware. For example, the FFT block 270 and the IFFT block 215 may be implemented in configurable software algorithms, where the value of size N may be modified according to an embodiment.

Although the embodiment using the FFT and IFFT is described, it is merely an example and should not be interpreted as limiting the scope of the present disclosure. Different types of transformation such as discrete Fourier transform (DFT) and inverse discrete Fourier transform (IDFT) functions may be used. It should be understood that the variable N may have random integer values (e.g., 1, 2, 3, 4, etc.) for the DFT and IDFT functions, and may have random integer values that are powers of 2 (e.g., 1, 2, 4, 8, 16, etc.) for the FFT and IFFT functions.

While FIGS. 2A and 2B illustrate examples of wireless transmission and reception paths, various modifications may be made to FIGS. 2A and 2B. For example, the various components of FIGS. 2A and 2B may be combined, subdivided or omitted, and additional components may be added according to a specific request. Also, FIGS. 2A and 2B are to illustrate examples of transmission and reception paths with types available in a wireless network. Any other appropriate architectures may be used to support wireless communications in the wireless network.

Figure 3A:
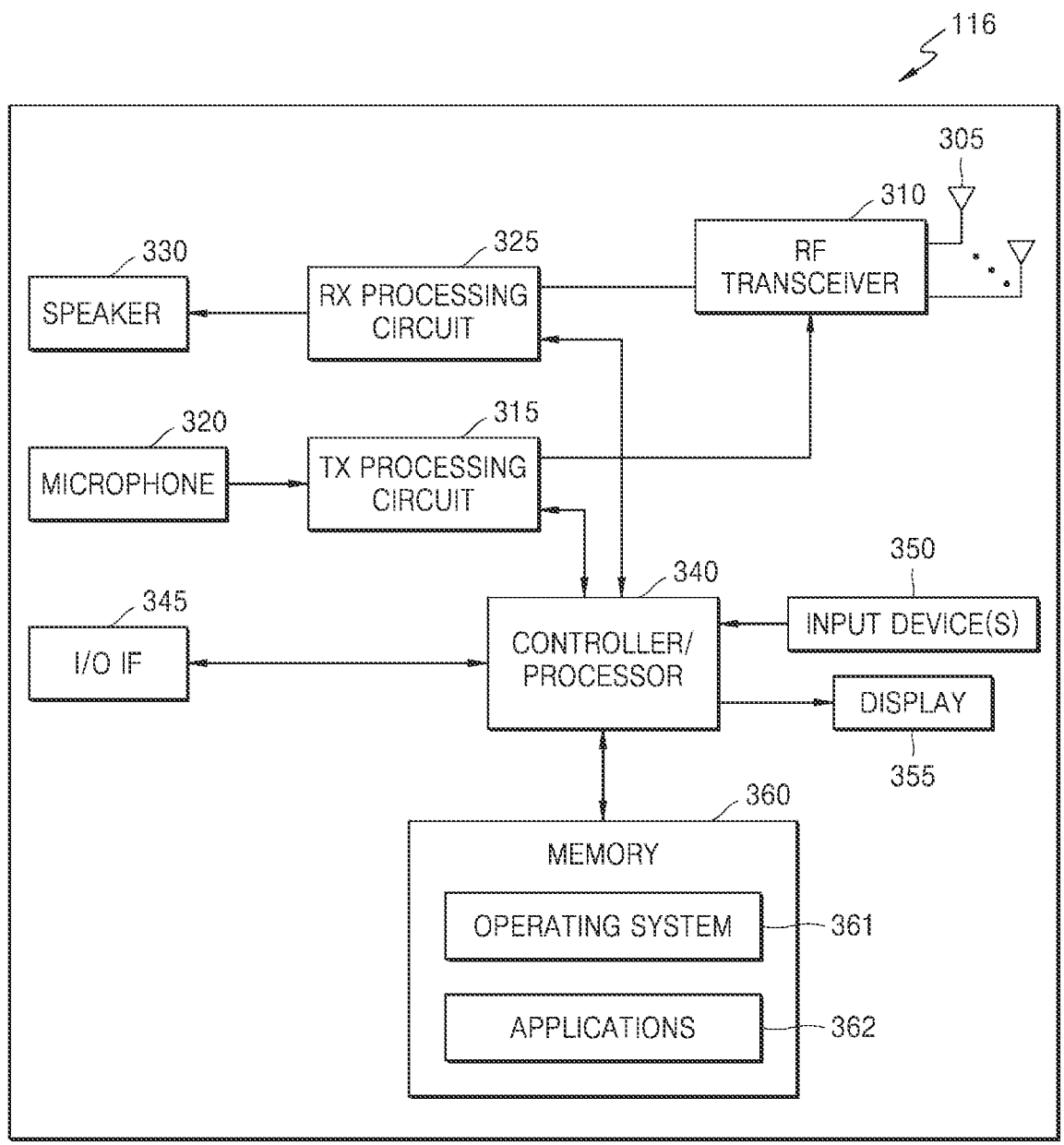
FIG. 3A illustrates an exemplary user equipment (UE) 116 according to the present disclosure.

FIG. 3A illustrates the UE 116 according to the present disclosure. An embodiment of the UE 116 shown in FIG. 3A is merely an example, and may have same or similar configuration to that of the UEs 111 to 115 of FIG. 1. However, UEs are provided with very various configurations, and FIG. 3A does not limit the scope of the present disclosure to specific implementation of a UE.

The UE 116 includes an antenna 305, an RF transceiver 310, a transmission (TX) processing circuit 315, a microphone 320, and a reception (RX) processing circuit 325. Also, the UE 116 includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by a gNB of the network 100. The RF transceiver 310 generates an intermediate frequency (IF) or a baseband signal by down-converting the incoming RF signal. The IF or baseband signal is transmitted to the RX processing circuit 325, and the RX processing circuit 325 generates a processed baseband signal by filtering, decoding, and/or digitizing the baseband or IF signal. The RX processing circuit 325 transmits the processed baseband signal to the speaker 330 (for voice data) or the main processor 340 for additional processing (on web browsing data).

The TX processing circuit 315 receives analog or digital voice data from the microphone 320 or other outgoing baseband data (such as web data, email, or interactive video game data) from the main processor 340. The TX processing circuit 315 generates a processed baseband or IF signal by encoding, multiplexing, and/or digitizing the outgoing baseband data. The RF transceiver 310 receives the outgoing processed baseband or IF signal from the TX processing circuit 315 and up-converts the baseband or IF signal to an RF signal to be transmitted via the antenna 305.

The main processor 340 may include one or more processors or other processing devices and may execute the basic OS program 361 stored in the memory 360 so as to control all operations of the UE 116. For example, the main processor 340 may control, according to well-known principles, reception of forward channel signals and transmission of reverse channel signals by the RF transceiver 310, the RX processing circuit 325, and the TX processing circuit 315. In some embodiments, the main processor 340 includes at least one microprocessor or microcontroller.

The main processor 340 may execute other processes and programs resident in the memory 360 for operations such as channel quality measurement and reporting for systems having 2D antenna arrays, as described in embodiments of the present disclosure. The main processor 340 may move data into the memory 360 or out of the memory, according to a request by an execution process. In some embodiments, the main processor 340 is configured to execute the applications 362, based on the OS program 361 or in response to signals received from gNBs or an operator. The main processor 340 is also coupled with the I/O interface 345, and the I/O interface provides a capability to the UE 116 to access other devices such as laptop computers and handheld computers. The I/O interface 345 is a communication path between these accessories and the main processor 340.

The main processor 340 is also coupled with the keypad 350 and the display 355. An operator of the UE 116 may input data to the UE 116 by using the keypad 350. The display 355 may be a liquid crystal display (LCD) or other display capable of rendering text and/or at least limited graphic from a website. The memory 360 is coupled with the main processor 340. A portion of the memory 360 may include a random-access memory (RAM), and the other portion of the memory 360 may include a flash memory or a read-only memory (ROM).

While FIG. 3A illustrates an example of the UE 116, various modifications may be made to FIG. 3A. For example, the various components of FIG. 3A may be combined, subdivided or omitted, and additional components may be added according to a specific request. In a specific embodiment, the main processor 340 may be divided into a plurality of processors, e.g., one or more central processing units (CPUs) and one or more graphics processing units (GPUs). While FIG. 3A illustrates the UE 116 configured as a mobile phone or a smart phone, UEs may be configured to operate as various types of mobile or stationary devices.

Figure 3B:
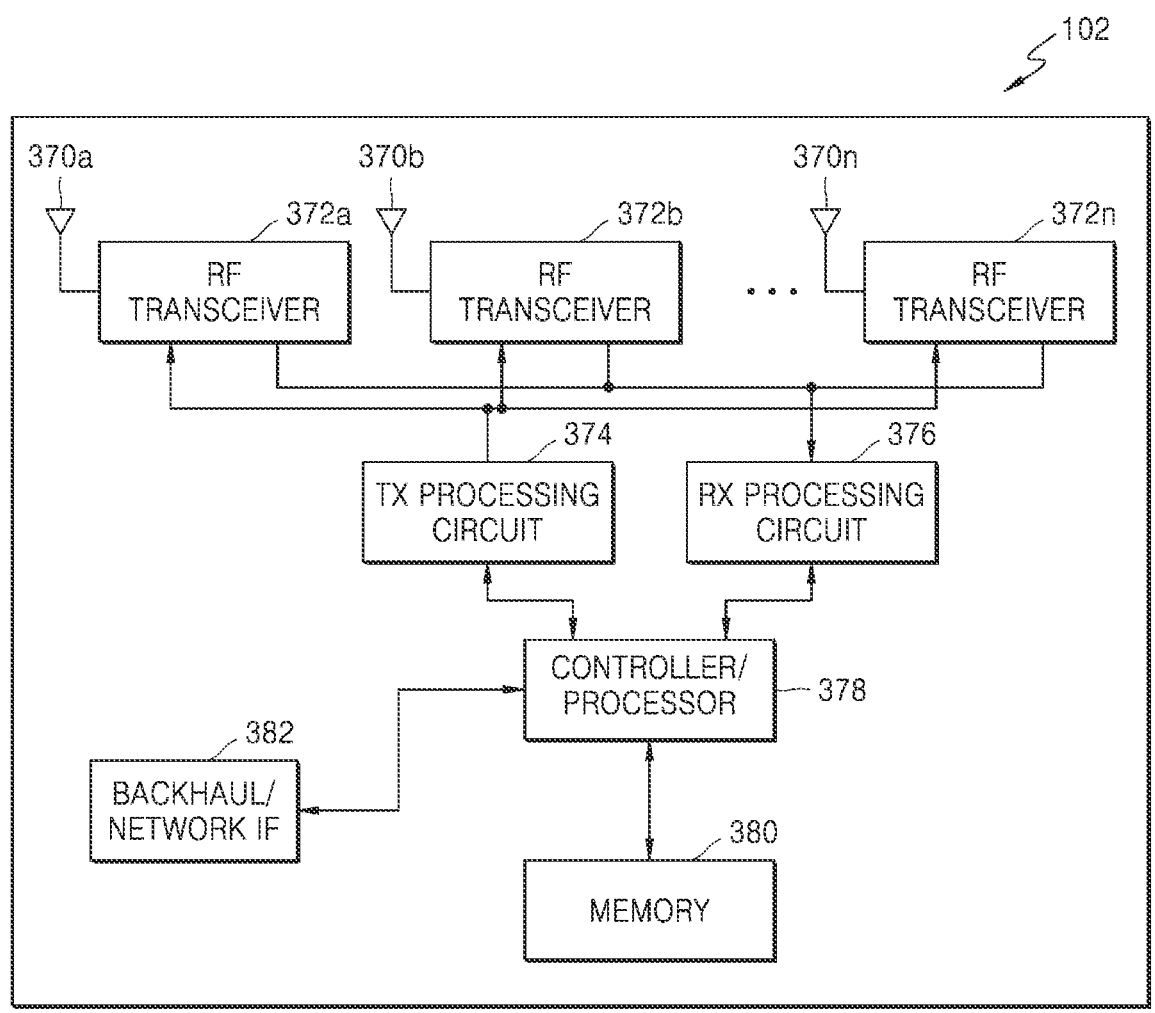
FIG. 3B illustrates an exemplary gNodeB (gNB) 102 according to the present disclosure.

FIG. 3B illustrates the gNB 102 according to the present disclosure. An embodiment of the gNB 102 shown in FIG. 3B is merely an example, and may have same or similar configuration to that of the gNBs of FIG. 1. However, gNBs are provided with very various configurations, and FIG. 3B does not limit the scope of the present disclosure to specific implementation of a gNB. It should be noted that the gNB 101 and the gNB 103 may include configuration same as or similar to the gNB 102.

As illustrated in FIG. 3B, the gNB 102 includes a plurality of antennas 370a to 370n, a plurality of RF transceivers 372a to 372n, a TX processing circuit 374, and an RX processing circuit 376. In specific embodiments, one or more of the plurality of antennas 370a to 370n include 2D antenna arrays. The gNB 102 also includes a controller/processor 378, a memory 380, and a backhaul or network interface 382.

The RF transceivers 372a to 372n receives incoming RF signals such as signals transmitted by UEs or other gNBs from the antennas 370a to 370n. The RF transceivers 372a to 372n generate IF or baseband signals by down-converting the incoming RF signals. The IF or baseband signals are transmitted to the RX processing circuit 376, and the RX processing circuit generates processed baseband signals by filtering, decoding, and/or digitizing the baseband or IF signals. The RX processing circuit 376 transmits the processed baseband signals to the controller/processor 378 for further processing.

The TX processing circuit 374 receives analog or digital data (such as voice data, web data, email, or interactive video game data) from the controller/processor 378. The TX processing circuit 374 generates processed baseband or IF signals by encoding, multiplexing, and/or digitizing the outgoing baseband data. The RF transceivers 372a to 372n receive the outgoing processed baseband or IF signals from the TX processing circuit 374 and up-convert the baseband or IF signals to RF signals to be transmitted via the antennas 370a to 370n.

The controller/processor 378 may include one or more processors or other processing devices for controlling all operations of the gNB 102. For example, the controller/processor 378 may control, according to well-known principles, reception of forward channel signals and transmission of reverse channel signals by the RF transceivers 372a to 372n, the RX processing circuit 376, and the TX processing circuit 374. The controller/processor 378 may also support additional functions such as further advanced wireless communication functions. For example, the controller/processor 378 performs a blind interference sensing (BIS) process by using a BIS algorithm and decodes a received signal from which interference signals are subtracted. Some random functions from among other various functions may be supported by the controller/processor 378 in the gNB 102. In some embodiments, the controller/processor 378 includes at least one microprocessor or microcontroller.

The controller/processor 378 may also execute programs such as a basic OS resident in the memory 380, and other processes. The controller/processor 378 may support channel quality measurement and reporting for systems having 2D antenna arrays, as described in embodiments of the present disclosure. In some embodiments, the controller/processor 378 supports communications between entities such as web real-time communication (RTC). The controller/processor 378 may move data into the memory 380 or out of the memory, according to a request by an execution process.

The controller/processor 378 may also be coupled with the backhaul or network interface 382. The backhaul or network interface 382 allows the gNB 102 to communicate with other devices or systems via backhaul connection or a network. The interface 382 may support communications via any appropriate wired or wireless connection(s). For example, when the gNB 102 is implemented as part of a cellular communication system (e.g., supporting of 5G, LTE, or LTE-A), the interface 382 may allow the gNB 102 to communicate with other gNBs by wired or wireless backhaul connection. When the gNB 102 is implemented as an access point (AP), the interface 382 may allow the gNB 102 to perform communication via a wired or wireless local area network (LAN) or by wired or wireless connection to a larger network (e.g., the Internet). The interface 382 may include any appropriate entity such as Ethernet or an RF transceiver to support communications via wired or wireless connection.

The memory 380 is coupled with the controller/processor 378. A portion of the memory 380 may include a RAM, and the other portion of the memory 380 may include a flash memory or a ROM. In some embodiments, a plurality of instructions, e.g., a BIS algorithm, are stored in a memory. The plurality of instructions are configured for the controller/processor 378 to perform a BIS process and decode a received signal after at least one interference signal determined by the BIS algorithm is subtracted.

As will be further described below, the transmission and reception paths (implemented by using the RF transceivers 372a to 372n, the TX processing circuit 374, and/or the RX processing circuit 376) of the gNB 102 support communication with a combination of frequency division duplex (FDD) cells and time division duplex (TDD) cells.

While FIG. 3B illustrates an example of the gNB 102, various modifications may be made to FIG. 3B. For example, the gNB 102 may include a random number of components shown in FIG. 3B. In a specific embodiment, the AP may include a plurality of interfaces 382, and the controller/processor 378 may support a routing function to route data between different network addresses. In another specific embodiment, while it is illustrated that the gNB 102 includes a single instance of the TX processing circuit 374 and a single instance of the RX processing circuit 376, but the gNB 102 may include a plurality of instances of each of them (one per RF transceiver).

There may be a demand for flexibly defining and operating a frame structure by considering various services and requirements in the 5G system. For example, the services may have different subcarrier spacings according to the requirements. In a current 5G communication system, a scheme of supporting a plurality of subcarrier spacings may be determined by using [Equation 1] below.

$$\Delta f = f_0 2^m \qquad \text{[Equation 1]}$$

Where, $f_0$ indicates a default subcarrier spacing in the system, and m indicates a scaling coefficient that is an integer. For example, when $f_0$ is 15 KHz, a set of subcarrier spacings that the 5G communication system may have may include 3.75 kHz, 7.5 kHz, 15 kHz, 30 kHz, 60 kHz, 120 KHz, 240 kHz, 480 kHz, or the like. An available set of subcarrier spacings may vary according to a frequency band. For example, in a frequency band equal to or less than 3.75 kHz, 7.5 kHz, 15 kHz, 30 kHz, and 60 KHz may be used, and in a frequency band equal to or greater than 6 GHz, 60 kHz, 120 kHz, and 240 kHz may be used.

The length of an OFDM symbol may vary depending on the subcarrier spacing constituting the OFDM symbol. This is because the subcarrier spacing and the OFDM symbol length are inversely proportional to each other, which is a characteristic feature of OFDM symbols. For example, when the subcarrier spacing doubles, the symbol length becomes half, and when the subcarrier spacing becomes half, the symbol length doubles.

The NR system selects a hybrid automatic repeat request (HARQ) scheme such that, when decoding fails during initial transmission, corresponding data is retransmitted in a physical layer. According to the HARQ scheme, when a receiver fails to correctly decode data, the receiver transmits information indicating the decoding failure (negative acknowledgement (NACK)) to a transmitter such that the transmitter can retransmit the corresponding data in the physical layer. The receiver combines data retransmitted by the transmitter with data that has previously failed to be decoded, thereby increasing data receiving performance. In addition, when the receiver correctly decodes data, the receiver transmits information indicating the successful decoding (acknowledgement (ACK)) to the transmitter such that the transmitter can transmit new data.

Figure 3C:
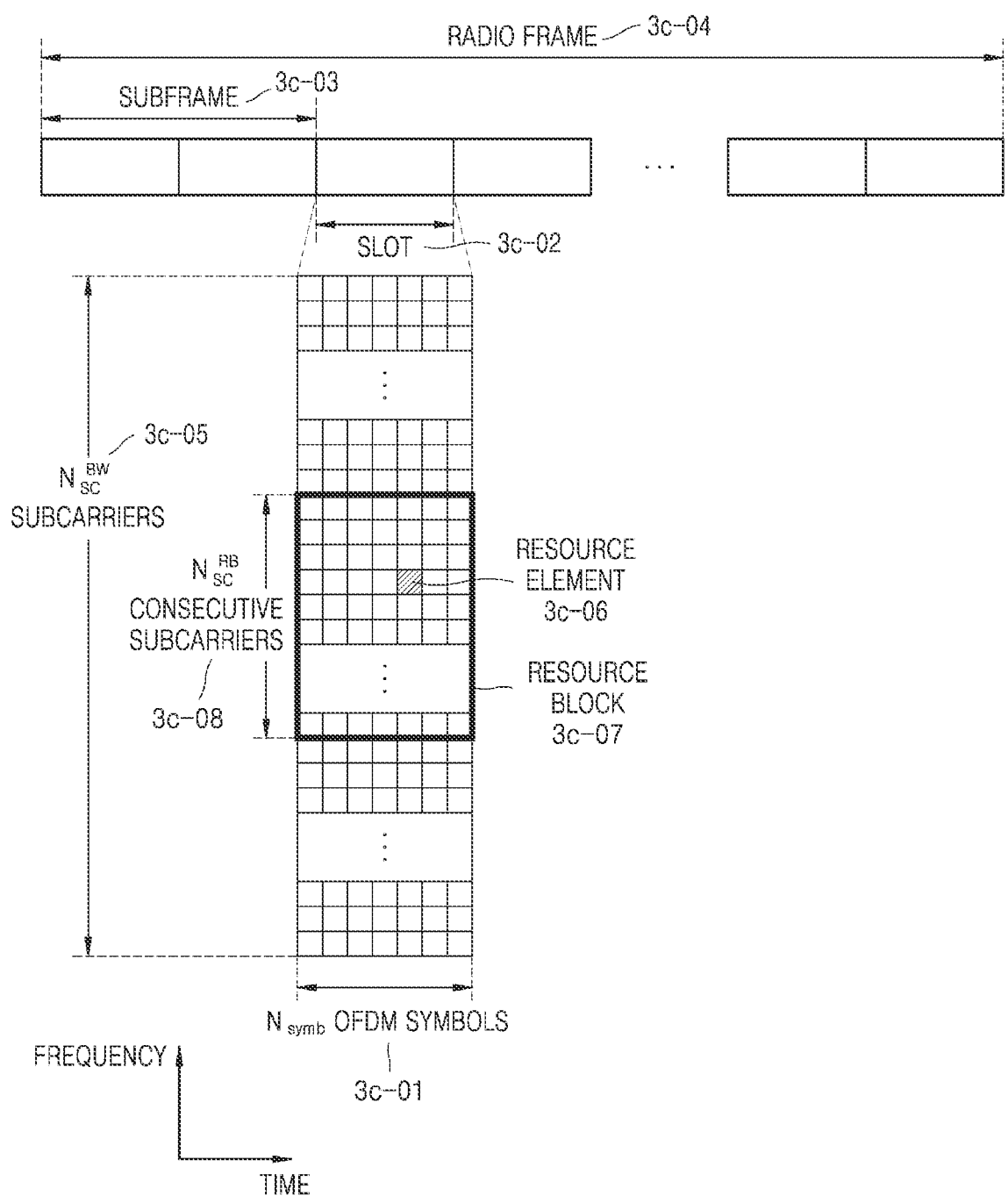
FIG. 3C illustrates a uplink (UL)/downlink (DL) time-frequency domain transmission structure in a New Radio (NR) system according to an embodiment of the present disclosure.

FIG. 3C illustrates a basic structure of a time-frequency domain that is a radio resource area in which data or control channel is transmitted in UL/DL in an NR system or a system similar thereto according to an embodiment of the present disclosure.

Referring to FIG. 3C, a horizontal axis indicates a time domain, and a vertical axis indicates a frequency domain. A minimum transmission unit in the time domain is an OFDM symbol or DFT-s-OFDM symbol, and $N_{symb}$ OFDM symbols 3c-01 are gathered to configure one slot 3c-02. Here, the OFDM symbol indicates a symbol used to transmit or receive a signal by using an OFDM multiplexing scheme, and the DFT-s-OFDM symbol indicates a symbol used to transmit or receive a signal by using a DFT-s-OFDM multiplexing scheme or an SC-FDMA multiplexing scheme. Hereinafter, for convenience of descriptions, the OFDM symbol and the DFT-s-OFDM symbol are not distinguished from each other and thus are collectively referred to as an OFDM symbol, and will now be described with reference to reception or transmission of a DL signal, but may also be applied to reception or transmission of an UL signal.

When spacing between subcarriers is 15 kHz, one slot constitutes one subframe 3c-03, and lengths of the slot and the subframe may each be 1 ms. The number of slots constituting one subframe 3c-03, and a length of a slot may vary according to spacing between subcarriers. For example, when spacing between subcarriers is 30 kHz, four slots are gathered to constitute one subframe 3c-03. In this case, a length of the slot is 0.5 ms, and a length of the subframe is 1 ms. A radio frame 3c-04 may be a time domain period configured of 10 subframes. A minimum transmission unit in the frequency domain is a subcarrier, and a transmission bandwidth of a whole system is configured of $N_{SC}^{BW}$ subcarriers 3c-05. However, these specific numerical values may be variably applied. For example, in the LTE system, spacing between subcarriers is 15 kHz, two slots are gathered to constitute one subframe 3c-03, and in this case, a length of a slot is 0.5 ms and a length of a subframe is 1 ms.

A basic unit of a resource in the time-frequency domain is a resource element (RE) 3c-06 and may be represented as a symbol index and a subcarrier index. A resource block (RB or a physical resource block (PRB)) 3c-07 may be defined as $N_{symb}$ consecutive OFDM symbols 3c-01 in the time domain and $N_{SC}^{RB}$ consecutive subcarriers 3c-08 in the frequency domain. Therefore, one RB 3c-07 in one slot may include $N_{symb} \times N_{SC}^{RB}$ number of REs. In general, a minimum data allocation unit in the frequency domain is the RB 3c-07. In the NR system, $N_{symb}=14$ and $N_{SC}^{RB}=12$, and the number of RBs ($N_{RB}$) may change according to a bandwidth of a system transmission band. In the LTE system, generally, Nsymb=7 and $N_{SC}^{RB}=12$, and $N_{RB}$ may change according to a bandwidth of a system transmission band.

DCI may be transmitted within first N OFDM symbols in the subframe. In general, N={1, 2, 3}, and the number of symbols in which the DCI is transmittable via a higher-layer signal may be configured for a UE by a BS. In addition, according to the amount of control information to be transmitted in a current slot, the BS may change, for each slot, the number of symbols in which DCI is transmittable in a slot, and may transmit information about the number of symbols to the UE via a separate DL control channel.

In the NR system, one component carrier (CC) or serving cell may include up to 250 RBs. Therefore, when the UE always receives a full serving cell bandwidth as in the LTE system, the power consumption of the UE may be severe. In order to solve this problem, the BS may configure one or more bandwidth parts (BWP) for the UE, thereby supporting the UE in changing a reception area in a cell. In the NR system, the BS may configure an "initial BWP", which is a bandwidth of CORESET #0 (or a common search space (CSS)), for the UE via a master information block (MIB). Afterward, the BS may configure the initial BWP (the first BWP) for the UE by radio resource control (RRC) signaling, and may report at least one piece of BWP configuration information that may be indicated via DCI at a later time. The BS may report a BWP ID via DCI, thereby indicating a band to be used by the UE. When the UE fails to receive the DCI in the currently allocated BWP for a specified time or longer, the UE returns to a "default BWP" and attempts to receive the DCI.

Figure 3D:
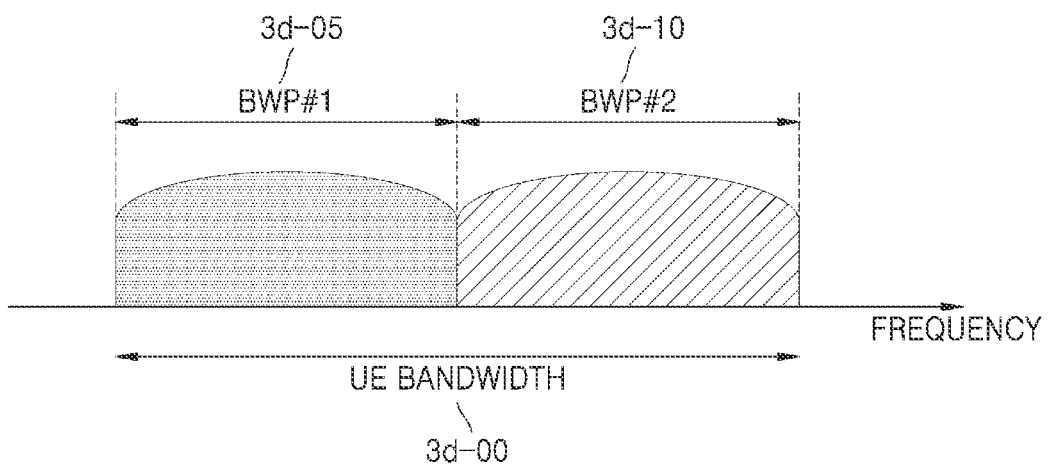
FIG. 3D illustrates an example of configuration of a bandwidth part (BWP) in a wireless communication system according to an embodiment of the present disclosure.

FIG. 3D illustrates an example of configuration of a BWP in a wireless communication system according to an embodiment of the present disclosure.

Referring to FIG. 3D, FIG. 3D shows an example in which a UE bandwidth 3d-00 is configured with two bandwidth parts, that is, BWP #1 3d-05 and BWP #2 3d-10. A BS may configure one BWP or a plurality of BWPs for the UE, and may configure, for each BWP, information as shown in [Table 1].

TABLE 1

```
BWP ::=                              SEQUENCE {
    bwp-Id
      BWP-Id,
    (bandwidth part identifier)
    locationAndBandwidth    INTEGER (1..65536),
      (location of bandwidth part)
```

TABLE 1-continued

| | | |
|---|---|---|
| subcarrierSpacing ENUMERATED {n0, n1, n2, n3, n4, n5}, | | |
| (subcarrier spacing) | | |
| cyclicPrefix ENUMERATED { extended } | | 5 |
| (cyclic prefix) | | |
| } | | |

The present disclosure is not limited to the above-described example, and not only configuration information but also various parameters associated with a BWP may be configured for the UE. The information may be transmitted from the BS to the UE by higher-layer signaling, for example, RRC signaling. Among one or multiple configured BWPs, at least one BWP may be activated. Information indicating whether to activate a configured BWP may be semi-statically transmitted from the BS to the UE by RRC signaling, or may be dynamically transmitted via a medium access control (MAC) control element (CE) or DCI.

According to an embodiment, the UE before RRC connection may receive configuration of an initial BWP for initial access from the BS via a MIB. In more detail, the UE may receive configuration information associated with a control resource set (CORESET) and a search space in which a PDCCH can be transmitted so as to receive system information (remaining system information (RMSI) or system information block 1 (SIB1)) required for initial access via the MIB in the initial access stage. Each of the CORESET and the search space configured via the MIB may be considered as identity (ID) 0.

The BS may inform the UE of configuration information such as frequency allocation information, time allocation information, and numerology for CORESET #0 via the MIB. Moreover, the BS may inform the UE of configuration information associated with a monitoring period and occasion of CORESET #0, that is, configuration information associated with search space #0, via the MIB. The UE may consider a frequency domain configured as CORESET #0 obtained from the MIB as an initial BWP for initial access. In this case, an ID of the initial BWP may be considered as 0.

In relation to a method for configuring a BWP, UEs before RRC connection may receive configuration information of an initial BWP via an MIB. In more detail, a CORESET for a DL control channel via which DCI for scheduling a system information block (SIB) can be transmitted may be configured for the UE via an MIB of a physical broadcast channel (PBCH). A bandwidth of the CORESET configured by the MIB may be considered as an initial BWP, and the UE may receive a PDSCH on which the SIB is transmitted, via the configured initial BWP. An initial BWP may be used for other system information (OSI), paging, and random access, in addition to the reception of the SIB.

In descriptions below, a synchronization signal (SS)/PBCH block in a next-generation mobile communication system (a 5G system or NR system) will be described.

An SS/PBCH block means a physical layer channel block including a primary SS (PSS), a secondary SS (SSS), and a PBCH. In more detail, the SS/PBCH block is defined below.
- PSS: This indicates a signal serving as a reference for DL time/frequency synchronization and provides a part of information of a cell ID.
- SSS: This is a reference for DL time/frequency synchronization and provides the remaining cell ID information which a PSS does not provide. In addition, the SSS may serve as a reference signal for demodulating a PBCH.
- PBCH: This provides necessary system information required for transmitting or receiving a data channel and a control channel by a UE. The necessary system information may include search space-associated control information indicating radio resource mapping information of a control channel, and scheduling control information of a separate data channel for transmitting system information.
- SS/PBCH block: An SS/PBCH block includes a combination of a PSS, an SSS, and a PBCH. One SS/PBCH block or a plurality of SS/PBCH blocks may be transmitted within 5 ms, and each of the transmitted SS/PBCH blocks may be distinguished from each other by an index.

The UE may detect the PSS and the SSS and may decode the PBCH in the initial access stage. An MIB may be obtained from the PBCH and CORESET #0 may be configured from the MIB. The UE may monitor CORESET #0, assuming that a selected SS/PBCH block and a demodulation reference signal (DMRS) transmitted on CORESET #0 are in a quasi-co-location (QCL). The UE may receive system information from DCI transmitted on CORESET #0. The UE may obtain, from the received system information, configuration information associated with a random access channel (RACH) required for initial access. The UE may transmit a physical RACH (PRACH) to the BS in consideration of a selected SS/PBCH index, and the BS having received the PRACH may obtain information about the SS/PBCH block index selected by the UE. The BS may monitor a block selected by the UE from among SS/PBCH blocks, and CORESET #0 corresponding to (or associated with) the selected SS/PBCH block.

In descriptions below, downlink control information (hereinafter, referred to as "DCI") in a next-generation mobile communication system (a 5G system or an NR system) will be described in detail.

In the next-generation mobile communication system (the 5G system or the NR system), scheduling information about UL data (or a physical UL data channel (a physical uplink shared channel (PUSCH))) or DL data (or a physical downlink data channel (a physical downlink shared channel, (PDSCH))) may be transmitted via DCI from a BS to a UE. The UE may monitor a fallback DCI format and a non-fallback DCI format for a PUSCH or a PDSCH. The fallback DCI format may include a fixed field pre-defined between the BS and the UE, and the non-fallback DCI format may include a configurable field.

The DCI may be subjected to a channel coding and modulation procedure, and then may be transmitted via a physical downlink control channel (PDCCH). A cyclic redundancy check (CRC) may be attached to a DCI message payload, and the CRC may be scrambled by a radio network temporary identifier (RNTI) corresponding to an identity of the UE. Different types of RNTIs may be used for scrambling the CRC that is attached to the DCI message payload, according to a purpose of the DCI message, for example, UE-specific data transmission, a power control command, a random access response, or the like. That is, an RNTI may not be explicitly transmitted, and may be included in a CRC calculation procedure so as to be transmitted. When a DCI message transmitted on a PDCCH is received, the UE may identify a CRC by using an allocated RNTI. When an identification result with respect to the CRC indicates matching of the RNTI, the UE may identify that the message has been transmitted to the UE.

For example, DCI for scheduling a PDSCH with respect to system information (SI) may be scrambled by an SI- RNTI. DCI for scheduling a PDSCH for a random access response (RAR) message may be scrambled by an RA-RNTI. DCI for scheduling a PDSCH for a paging message may be scrambled by a P-RNTI. DCI for notifying a slot format indicator (SFI) may be scrambled by an SFI-RNTI. DCI for notifying a transmission power control (TPC) may be scrambled by a TPC-RNTI. DCI for scheduling a UE-specific PDSCH or PUSCH may be scrambled by a cell RNTI (C-RNTI).

DCI format 0_0 may be used for fallback DCI for scheduling a PUSCH, and in this case, a CRC may be scrambled by a C-RNTI. In an embodiment, DCI format 0_0 having a CRC scrambled by a C-RNTI may include information as shown in [Table 2] below.

TABLE 2

Identifier for DCI formats (DCI format identifier) - [1] bit
Frequency domain resource allocation -
$[\lceil \log_2( N_{RB}^{UL,BWP}(N_{RB}^{UL,BWP} + 1)/2) \rceil]$ bits TABLE 2-continued Time domain resource allocation - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
Uplink/supplementary uplink (UL/SUL) indicator - 0 or 1 bit DCI format 0_1 may be used for non-fallback DCI for scheduling a PUSCH, and in this case, a CRC may be scrambled by a C-RNTI. In an embodiment, DCI format 0_1 having a CRC scrambled by a C-RNTI may include information as shown in [Table 3] below.

TABLE 3

Carrier indicator - 0 or 3 bits
UL/SUL indicator - 0 or 1 bit
Identifier for DCI formats - [1] bits
Bandwidth part indicator - 0, 1, or 2 bits
Frequency domain resource allocation
    For resource allocation type 0, $\lceil N_{RB}^{UL,BWP}/P \rceil$ bits
    For resource allocation type 1, $\lceil \log_2( N_{RB}^{UL,BWP}(N_{RB}^{UL,BWP} + 1)/2) \rceil$ bits
Time domain resource assignment - 1, 2, 3, or 4 bits
VRB-to-PRB mapping (mapping between virtual resource block and physical resource block) - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink allocation index - 1 or 2 bits
    1 bit for semi-static HARQ-ACK codebook;
    2 bits for dynamic HARQ-ACK codebook with
    single HARQ-ACK codebook.
2nd downlink allocation index - 0 or 2 bits
    2 bits for dynamic HARQ-ACK codebook with
    two HARQ-ACK sub-codebooks;
    0 bit otherwise.
TPC command for scheduled PUSCH - 2 bits
SRS resource indicator - $\lceil \log_2 (\Sigma_{k=1}^{Lmax} \Sigma(N_{SRS_k})) \rceil$ or $\lceil \log_2 (N_{SRS}) \rceil$ bits
    $\lceil \log_2 (\Sigma_{k=1}^{Lmax} \Sigma(N_{SRS_k})) \rceil$ bits for non-codebook based PUSCH transmission (if PUSCH transmission is not based on codebook);
    $\lceil \log_2(N_{SRS}) \rceil$ bits for codebook based PUSCH transmission (if PUSCH transmission is based on codebook).
Precoding information and number of layers - up to 6 bits
Antenna ports - up to 5 bits
SRS request - 2 bits
CSI request (wherein CSI indicates channel state information) - 0, 1, 2, 3, 4, 5, or 6 bits
Code block group (CBG) transmission information - 0, 2, 4, 6, or 8 bits
Phase tracking reference signal (PTRS)-Demodulation reference signal (DMRS) association - 0 or 2 bits.
    beta_offset indicator - 0 or 2 bits
    DMRS sequence initialization - 0 or 1 bit DCI format 1_0 may be used for fallback DCI for scheduling a PDSCH, and in this case, a CRC may be scrambled by a C-RNTI. In an embodiment, DCI format 1_0 having the CRC scrambled by the C-RNTI may include information as shown in [Table 4] below.

TABLE 4

Identifier for DCI formats - [1] bit
Frequency domain resource allocation -
$[\lceil \log_2( N_{RB}^{DL,BWP}(N_{RB}^{DL,BWP} + 1)/2) \rceil]$ bits
Time domain resource allocation - X bits
VRB-to-PRB mapping - 1 bit.
Modulation and coding scheme - 5 bits
New data indicator - 1 bit
Redundancy version - 2 bits
HARQ process number - 4 bits
Downlink allocation index - 2 bits
TPC command for scheduled PUCCH - [2] bits
Physical uplink control channel (PUCCH) resource indicator - 3 bits
PDSCH-to-HARQ feedback timing indicator - [3] bits Alternatively, DCI format 1_0 may be used for DCI for scheduling a PDSCH associated with an RAR message, and in this case, a CRC may be scrambled by an RA-RNTI. In an embodiment, DCI format 1_0 having the CRC scrambled by the RA-RNTI may include information as shown in [Table 5] below.

TABLE 5

Frequency domain resource allocation -
$[\lceil \log_2( N_{RB}^{DL,BWP}(N_{RB}^{DL,BWP} + 1)/2) \rceil]$ bits
Time domain resource allocation - 4 bits
VRB-to-PRB mapping - 1 bit
Modulation and coding scheme - 5 bits
TB scaling - 2 bits
Reserved bits - 16 bits DCI format 1_1 may be used for non-fallback DCI for scheduling a PDSCH, and in this case, a CRC may be scrambled by a C-RNTI. In an embodiment, DCI format 1_1 having the CRC scrambled by the C-RNTI may include information as shown in [Table 6].

TABLE 6

Carrier indicator - 0 or 3 bits

Identifier for DCI formats - [1] bits

Bandwidth part indicator - 0, 1, or 2 bits

Frequency domain resource allocation

For resource allocation type 0, $\lceil N_{RB}^{DL,BWP}/P \rceil$ bits

For resource allocation type 1, $\lceil \log_2( N_{RB}^{DL,BWP}(N_{RB}^{DL,BWP} + 1)/2) \rceil$ bits Time domain resource allocation - 1, 2, 3, or 4 bits VRB-to-PRB mapping - 0 or 1 bit, only for resource allocation type 1.

0 bit if only resource allocation type 0 is configured;

1 bit otherwise.

Physical resource block (PRB) bundling size indicator - 0 or 1 bit

Rate matching indicator - 0, 1, or 2 bits

Zero power channel state information-reference signal (ZP CSI-RS) trigger - 0, 1, or 2 bits For transport block 1:

Modulation and coding scheme - 5 bits

New data indicator - 1 bit

Redundancy version - 2 bits

For transport block 2:

Modulation and coding scheme - 5 bits

New data indicator - 1 bit

Redundancy version - 2 bits

HARQ process number - 4 bits

Downlink allocation index - 0 or 2 or 4 bits

TPC command for scheduled PUCCH - 2 bits

PUCCH resource indicator - 3 bits

PDSCH-to-HARQ_feedback timing indicator - 3 bits

Antenna ports - 4, 5, or 6 bits

Transmission configuration indication - 0 or 3 bits

SRS request - 2 bits

Code block group (CBG) transmission information - 0, 2, 4, 6, or 8 bits

CBG flushing out information - 0 or 1 bit

DMRS sequence initialization - 1 bit

Figure 3E:
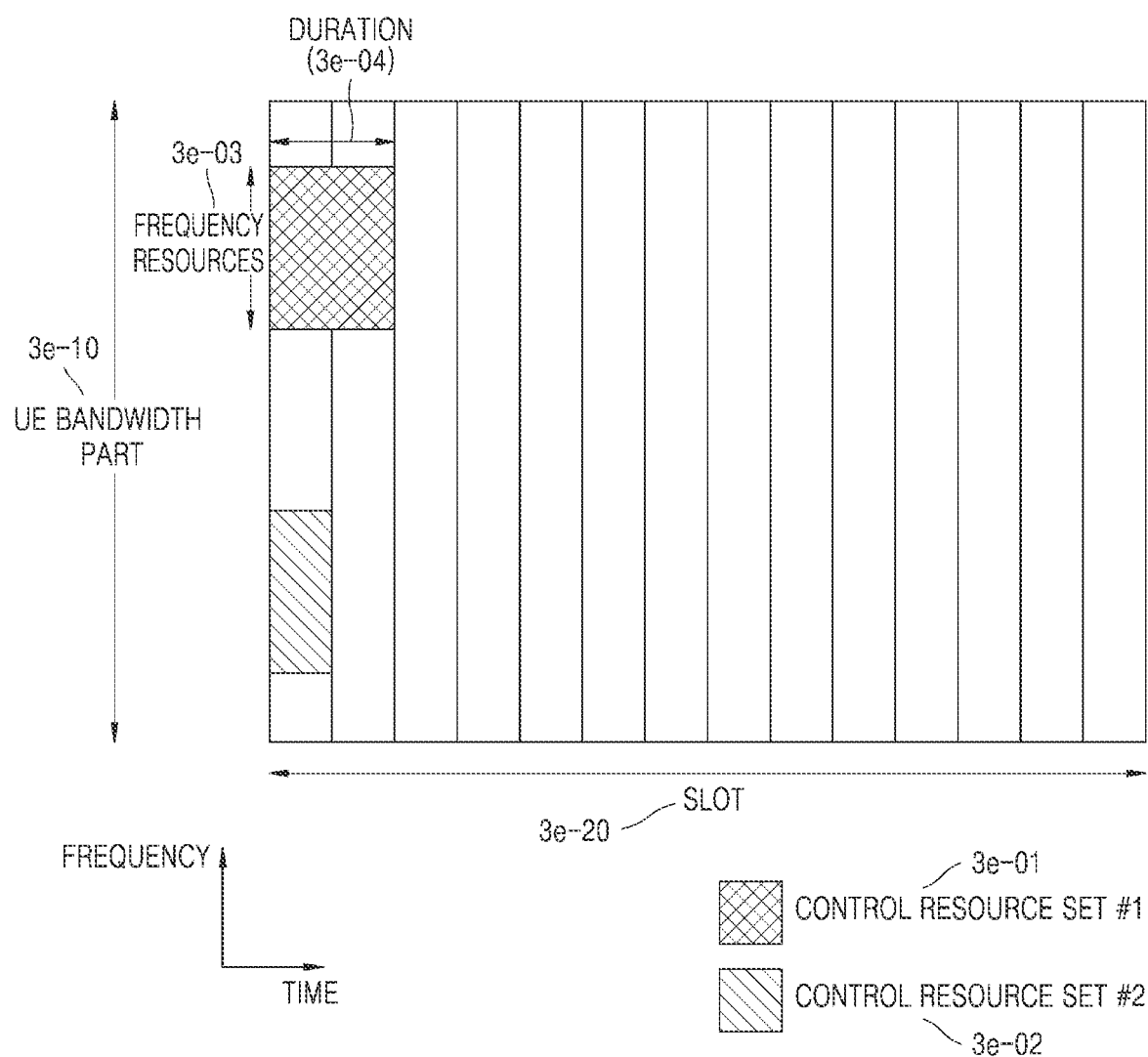
FIG. 3E illustrates an example of a configuration of a control resource set of a DL control channel in a wireless communication system according to an embodiment of the present disclosure.

FIG. 3E illustrates an embodiment of a CORESET on which a DL control channel is transmitted in a 5G wireless communication system according to an embodiment of the present disclosure.

Referring to FIG. 3E, FIG. 3E shows an embodiment in which a UE BWP 3e-10 is configured along a frequency axis, and two CORESETs (CORESET #1 3e-01 and CORESET #2 3e-02) are configured in one slot 3e-20 along a time axis. The CORESETs 3e-01 and 3e-02 may be configured in a specific frequency resource 3e-03 in the UE BWP 3e-10 along the frequency axis. In the CORESETs 3e-01 and 3e-02, one OFDM symbol or a plurality of OFDM symbols may be configured along the time axis, and the configured OFDM symbol or symbols may be defined as a CORESET duration 3e-04. Referring to FIG. 3E, CORESET #1 3e-01 may be configured to have a CORESET duration of two symbols, and CORESET #2 3e-02 may be configured to have a CORESET duration of one symbol.

A CORESET in the above-described next-generation mobile communication system (the 5G system or the NR system) may be configured for a UE by a BS by higher-layer signaling (for example, system information, MIB, and RRC signaling). Configuring a CORESET for a UE means providing information such as a CORESET identifier (identity), the frequency location of the CORESET, the symbol length of the CORESET, etc. For example, the configuration of the CORESET may include information as shown in [Table 7] below.

TABLE 7

```
ControlResourceSet ::=                    SEQUENCE {
    -- Corresponds to L1 parameter 'CORESET-ID'
    controlResourceSetId
    ControlResourceSetId,
        (control resource set identifier(Identity))
    frequencyDomainResources        BIT STRING (SIZE (45)),
        (frequency-axis resource allocation information)
    duration                        INTEGER
    (1..maxCoReSetDuration),
        (time-axis resource allocation information)
    cce-REG-MappingType             CHOICE {
        (CCE-to-REG mapping scheme)
        interleaved
    SEQUENCE {
        reg-BundleSize
    ENUMERATED {n2, n3, n6},
        (REG bundle size)
        precoderGranularity
    ENUMERATED {sameAsREG-bundle, allContiguousRBs},
    interleaverSize
    ENUMERATED {n2, n3, n6}
        (interleaver size)
        shiftIndex
    INTEGER(0..maxNrofPhysicalResourceBlocks-1)
        (interleaver shift)
    },
    nonInterleaved
    NULL
    },
    tci-StatesPDCCH
    SEQUENCE(SIZE (1..maxNrofTCI-StatesPDCCH)) OF TCI-StateId
            OPTIONAL,
        (QCL configuration information)
    tci-PresentInDCI
    ENUMERATED {enabled}
}
``` tci-StatesPDCCH (hereinafter, referred to as a "TCI state") configuration information shown in [Table 7] may include information about an index or indices of one synchronization signal (SS)/physical broadcast channel (PBCH) block or a plurality of SS/PBCH blocks which are in a quasi-co-located (QCL) relation with a demodulation reference signal (DMRS) transmitted on a corresponding CORESET, or information about an index of a channel state information reference signal (CSI-RS). frequencyDomainResources configuration information configures a frequency resource of the corresponding CORESET as a bitmap in which each bit indicates a group of non-overlapping six PRBs. The first group means a group of six PRBs having the first PRB index of $6 \cdot \lceil N_{BWP}^{start}/6 \rceil$ where $N_{BWP}^{start}$ indicates a start point of a BWP. The most significant bit of the bitmap indicates the first group and the bits are configured in an ascending order.

In the wireless communication system, different antenna ports (which may be repeated as one or more channels, signals, or a combination thereof, but are collectively referred to as "different antenna ports" for convenience of further descriptions in the present disclosure) may be associated with each other according to QCL configuration as shown in [Table 8] below.

TABLE 8

```
QCL-Info ::=           SEQUENCE
    cell               ServCellIndex (an index of a serving cell in
which QCL reference RS is transmitted)
    bwp-ID             BWP-Id (an index of a bandwidth part in
which QCL reference RS is transmitted)
    referenceSignal    CHOICE { (an indicator indicating one
                               of CSI-RS and
SS/PBCH as a QCL reference RS)
            csi-rs     NZP-CSI-RS-ResourceId,
    s       sb         SSB-Index
    },
    qcl-Type           ENUMERATED {typeA, typeB,
typeC, type D}, (QCL type indicator)
    ...
}
```

In detail, in QCL configuration, two different antenna ports may be associated with each other, based on a relation between a (QCL) target antenna port and a (QCL) reference antenna port. The UE may apply (or assume) all or some of channel statistical characteristics measured by the reference antenna port (for example, a large-scale parameter of a channel, such as a Doppler shift, a Doppler spread, an average delay, a delay spread, an average gain, a spatial Rx (or Tx) parameter, a reception space filter parameter of the UE, or a transmission space filter parameter of the UE) at the time of target antenna port reception. In descriptions above, the target antenna means an antenna port for transmitting a channel or a signal configured by higher-layer configuration including the QCL configuration, or an antenna port for transmitting a channel or a signal to which a TCI state indicating the QCL configuration is applied. The reference antenna port means an antenna port for transmitting a channel or a signal indicated (or specified) by a referenceSignal parameter in the QCL configuration.

In particular, channel statistical characteristics specified by the QCL configuration (or indicated by the parameter qcl-Type in the QCL configuration) may be classified as below according to a QCL type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In this case, the QCL type is not limited to the four types above, and all available combinations are not listed so as not to obscure the essence of the description. QCL-TypeA corresponds to a QCL type used in a case where a bandwidth and a transmission interval of the target antenna port are more sufficient than those of the reference antenna port (in other words, in a case where the number of samples and the transmission bandwidth/time of the target antenna port are greater than the number of samples and the transmission bandwidth/time of the reference antenna port in both the frequency axis and the time axis), and therefore, all statistical characteristics that are measurable in the frequency axis and the time axis may be referred to. QCL-TypeB corresponds to a QCL type used in a case where the bandwidth of the target antenna port is sufficient for measurement of statistical characteristics, in other words, the Doppler shift and Doppler spread parameters, which are measurable in the frequency. QCL-TypeC corresponds to a QCL type used in a case where the bandwidth and the transmission interval of the target antenna port are insufficient for measurement of second-order statistics, in other words, the Doppler spread and delay spread parameters, and therefore, only first-order statistics, in other words, only the Doppler shift and average delay parameters, may be referred to. QCL-TypeD corresponds to a QCL type configured when spatial reception filter values used at the time of reference antenna port reception are used at the time of target antenna port reception.

The BS may configure or indicate the maximum two QCL configurations for the target antenna port or for the target antenna port via TCI state configuration as shown in [Table 9] below.

TABLE 9

| TCI-State ::= | SEQUENCE { |
|---|---|
| tci-StateId | TCI-StateId, (TCI state indicator) |
| qcl-Type1 | QCL-Info, (the first QCL configuration for the target antenna port to which the corresponding TCI state is applied) |
| qcl-Type2 | QCL-Info (the second QCL configuration for the target antenna port to which the corresponding TCI state is applied) OPTIONAL,   --Need R |
| ... |  |
| } |  |

The first QCL configuration from among two QCL configurations included in one TCI state configuration may be configured to be one of QCL-TypeA, QCL-TypeB, and QCL-TypeC In this case, the configurable QCL type is specified by the types of the target antenna port and the reference antenna port and will be described in detail below. In addition, the second QCL configuration from among two QCL configurations included in the TCI state configuration may be configured to be QCL-TypeD and may be omitted in some cases.

Tables 10 to 14 show valid TCI state configurations according to the type of the target antenna port.

Table 10 shows valid TCI state configurations of a case where the target antenna port is a CSI-RS for tracking (TRS). The TRS means an NZP CSI-RS for which a repetition parameter is not configured and trs-Info is configured to have a value of "true", from among CSI-RSs. In Table 10, when configuration 3 is configured, the target antenna port may be used for an aperiodic TRS.

TABLE 10

Valid TCI state configurations when the target antenna port is CSI-RS for tracking (TRS)

| Valid TCI state configuration | DL RS 1 | qcl-Type1 | DL RS 2 (when configured) | qcl-Type2 (when configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 11 shows valid TCI state configurations in a case where the target antenna port is a CSI-RS for CSI. The CSI-RS means an NZP CSI-RS for which a repetition parameter is not configured and trs-Info is not configured to have a value of "true", from among CSI-RSs.

TABLE 11

Valid TCI state configurations when the target antenna port is CSI-RS for CSI

| Valid TCI state configuration | DL RS 1 | qcl-Type1 | DL RS 2 (when configured) | qcl-Type2 (when configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB |  |  |

Table 12 shows valid TCI state configurations in a case where the target antenna port is a CSI-RS for beam management (BM) (which is the same as a CSI-RS for L1 RSRP reporting). The CSI-RS of BM means an NZP CSI-RS for which a repetition parameter is configured and has a value of "on" or "off" and trs-info is not configured to have a value of "true", from among CSI-RSs.

TABLE 12

Valid TCI state configurations when the target antenna port is CSI-RS for BM (for L1 RSRP reporting)

| Valid TCI state configuration | DL RS 1 | qcl-Type1 | DL RS 2 (when configured) | qcl-Type2 (when configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 13 shows valid TCI state configurations when the target antenna port is a PDCCH DMRS.

TABLE 13

Valid TCI state configurations when the target antenna port is PDCCH DMRS

| Valid TCI state configuration | DL RS 1 | qcl-Type1 | DL RS 2 (when configured) | qcl-Type2 (when configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 14 shows valid TCI state configurations when the target antenna port is a PDSCH DMRS.

TABLE 14

Valid TCI state configurations when the target antenna port is PDSCH DMRS

| Valid TCI state configuration | DL RS 1 | qcl-Type1 | DL RS 2 (when configured) | qcl-Type2 (when configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration scheme according to TABLES 10 to 14, the target antenna port and the reference antenna port at each stage are configured and managed in a manner of "SSB" □ "TRS" □ "CSI-RS for CSI, CSI-RS for BM, PDCCH DMRS, or PDSCH DMRS". Accordingly, the statistical characteristics measurable from the SSB and the TRS are associated with the antenna ports, and thus a reception operation by the UE may be supported.

Figure 4:
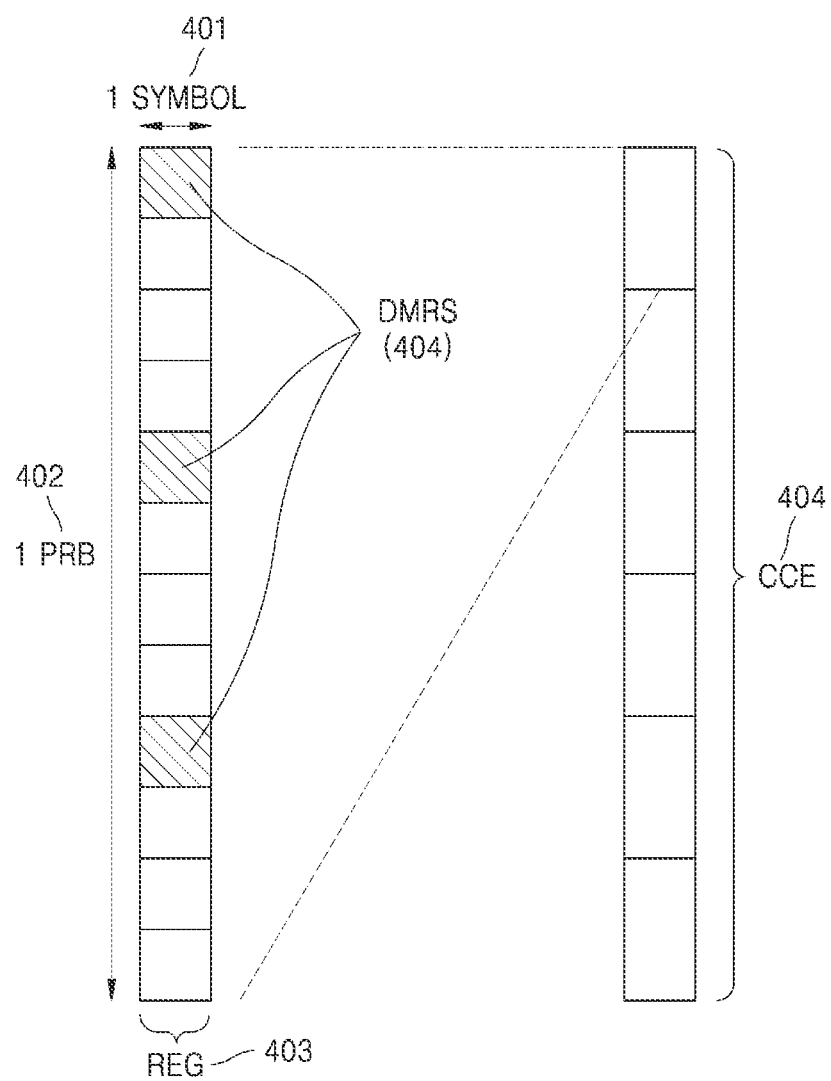
FIG. 4 illustrates a structure of a DL control channel in an NR system according to an embodiment of the present disclosure.

FIG. 4 illustrates a structure of a DL control channel in a wireless communication system according to an embodiment of the present disclosure. That is, FIG. 4 illustrates an example of a basic unit of a time and frequency resource included in a DL control channel that may be used by 5G according to an embodiment of the present disclosure.

Referring to FIG. 4, the basic unit of the time and frequency resource included in the control channel may be defined by a resource element group (REG) 403. The REG 403 may be defined as one OFDM symbol 401 on the time axis and one physical resource block (PRB) 402 on the frequency axis, and in other words, may be defined as 12 subcarriers. It is possible to configure a DL control channel allocation unit by concatenating the REG 403.

As illustrated in FIG. 4, in the 5G system, when the basic unit to which the DL control channel is allocated is a control channel element (CCE) 404, one CCE 404 may include a plurality of REGs 403. For example, the REG 403 of FIG. 4 may include 12 REs, and when one CCE 404 includes six REGs 403, one CCE 404 may include 72 REs. When a DL control resource set is configured, the corresponding resource set may include a plurality of CCEs 404, and a specific DL control channel may be mapped to one or a plurality of CCEs 404 according to an aggregation level (AL) within the control resource set and then may be transmitted. The CCEs 404 within the control resource set may be distinguished by numbers, and the numbers of the CCEs 404 may be allocated according to a logical mapping scheme.

The basic unit of the DL control channel shown in FIG. 4, that is, the REG 403, may include all REs to which the DCI is mapped and a region to which a DMRS 405 that is a reference signal for decoding the REs is mapped. As shown in FIG. 4, three DMRSs 405 may be transmitted within one REG 403. The number of CCEs required to transmit a PDCCH may be 1, 2, 4, 8, or 16 according to an aggregation level (AL), and a different number of CCEs may be used to implement link adaptation of the DL control channel. For example, when AL=L, one DL control channel may be transmitted via L CCEs.

A UE is required to detect a signal in a state in which the UE does not know information about the DL control channel, and a search space indicating a set of CCEs may be defined for blind decoding. The search space is a set of candidate control channels including CCEs for which the UE has to attempt decoding at a given AL. As there are a plurality of ALs at which a set of CCEs is configured by 1, 2, 4, 8, and 16 CCEs, the UE has a plurality of search spaces. The search space set may be defined as a set of search spaces at all configured ALs.

The search spaces may be classified into a common search space and a terminal (UE)-specific search space. According to an embodiment of the present disclosure, UEs in a predetermined group or all UEs may search for a common search space of the PDCCH so as to receive cell-common control information such as dynamic scheduling of system information or paging messages.

For example, the UE may receive PDSCH scheduling allocation information for transmission of an SIB including information about a service provider of a cell by searching for a common search space of the PDCCH. In a case of the common search space, UEs in a predetermined group or all UEs have to receive the PDCCH, so that the common search space may be defined as a set of pre-arranged CCEs. Scheduling allocation information of a UE-specific PDSCH or PUSCH may be received by searching for a UE-specific search space of the PDCCH. The UE-specific search space may be defined in a terminal-specific manner as a terminal identity and a function of various system parameters.

In the 5G system, parameters for the PDCCH search space may be configured for the UE by a BS by higher-layer signaling (for example, SIB, MIB, or RRC signaling). For example, the BS may configure, for the UE, the number of PDCCH candidates at each AL L, a monitoring period of the search space, a monitoring occasion in units of symbols within a slot for the search space, a search space type (a common search space or a UE-specific search space), a combination of a DCI format and an RNTI to be monitored in the corresponding search space, a control resource set index for monitoring the search space, and the like. For example, the above-described configuration may include information as shown in [Table 15] below.

TABLE 15

```
SearchSpace ::=
SEQUENCE {
  -- Identity of the search space. SearchSpaceId = 0 identifies
    the SearchSpace configured via
PBCH (MIB) or ServingCellConfigCommon.
  searchSpaceId
  SearchSpaceId,
    (search space identifier)
  controlResourceSetId
  ControlResourceSetId,
    (control resource set identifier)
monitoringSlotPeriodicityAndOffset            CHOICE
{
    (monitoring slot level period)
    sl1
NULL,
    sl2
INTEGER (0..1),
    sl4
INTEGER (0..3),
    sl5
INTEGER (0..4),
    sl8
INTEGER (0..7),
    sl10
INTEGER (0..9),
    sl16
INTEGER (0..15),
    sl20
INTEGER (0..19)
  }                                           OPTIONAL,
    duration(monitoring duration)             INTEGER
(2..2559)
  monitoringSymbolsWithinSlot
BIT STRING (SIZE (14))
OPTIONAL,
    (monitoring symbols in slot)
  nrofCandidates
SEQUENCE {
    (the number of PDCCH candidate groups for each aggregation level)
      aggregationLevel1
ENUMERATED {n0, n1, n2, n3, n4, n5, n6, n8},
      aggregationLevel2
ENUMERATED {n0, n1, n2, n3, n4, n5, n6, n8},
      aggregationLevel4
ENUMERATED {n0, n1, n2, n3, n4, n5, n6, n8},
      aggregationLevel8
ENUMERATED {n0, n1, n2, n3, n4, n5, n6, n8},
      aggregationLevel16
ENUMERATED {n0, n1, n2, n3, n4, n5, n6, n8}
  },
  searchSpaceType
CHOICE {
  (search space type)
    -- Configures this search space as common search space (CSS) and DCI formats to
monitor.
    common
SEQUENCE {
  (common search space)
    }
    ue-Specific
SEQUENCE {
  (UE-specific search space)
      -- Indicates whether the UE monitors in this USS for DCI formats 0-0 and
1-0 or for formats 0-1 and 1-1.
      formats
    ENUMERATED {formats0-0-And-1-0, formats0-1-And-1-1},
      ...
    }
```

The BS may configure one or a plurality of search space sets for the UE according to the configuration information. In an embodiment of the present disclosure, the BS may configure search space set 1 and search space 2 for the UE, and the configuration may be performed such that DCI format A scrambled by an X-RNTI in search space set 1 is monitored in the common search space and DCI format B scrambled by a Y-RNTI in search space set 2 is monitored in the UE-specific search space.

According to the configuration information, there may be one or a plurality of search space sets in the common search space or the UE-specific search space. For example, search space set #1 and search space set #2 may be configured as common search spaces, and search space set #3 and search space set #4 may be configured as UE-specific search spaces.

The common search spaces may be classified into a specific type of search space sets according to a purpose thereof. RNTIs to be monitored may be different for each determined search space set type. For example, the common search space types, the purposes, and the RNTIs to be monitored may be classified as shown in Table 16 below

TABLE 16

| Search space type | Purpose | RNTI |
|---|---|---|
| Type0 CSS | PDCCH transmission for SIB scheduling | SI-RNTI |
| Type0A CSS | PDCCH transmission for SI scheduling (SIB2, etc.) other than SIB1 | SI-RNTI |
| Type1 CSS | PDCCH transmission for random-access response (RAR) scheduling, Msg3 retransmission scheduling, and Msg4 scheduling | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
| | PDCCH transmission for data scheduling in case of PCell | C-RNTI, MCS-C-RNTI, CS-RNTI |

In a common search space, following combinations of a DCI format and a RNTI may be monitored, but the present disclosure is not limited to the examples below.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In a UE-specific search space, following combinations of a DCI format and a RNTI may be monitored, but the present disclosure is not limited to the examples below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs with the described types may follow definitions and purposes below.

Cell RNTI (C-RNTI): UE-specific PDSCH scheduling purpose

Temporary Cell RNTI (TC-RNTI): UE-specific PDSCH scheduling purpose

Configured Scheduling RNTI (CS-RNTI): Semi-statically configured UE-specific PDSCH scheduling purpose Random Access RNTI (RA-RNTI): The purpose of scheduling a PDSCH in a random access stage Paging RNTI (P-RNTI): The purpose of scheduling a PDSCH on which paging is transmitted System Information RNTI (SI-RNTI): The purpose of scheduling a PDSCH on which system information is transmitted Interruption RNTI (INT-RNTI): The purpose of notifying of whether a PDSCH is punctured Transmit Power Control for PUSCH RNTI (TPC-PUSCH-RNTI): The purpose of indicating a power control command for a PUSCH Transmit Power Control for PUCCH RNTI (TPC-PUCCH-RNTI): The purpose of indicating a power control command for a PUCCH Transmit Power Control for SRS RNTI (TPC-SRS-RNTI): The purpose of indicating a power control command for an SRS In an embodiment, the described DCI formats may follow definitions in [Table 17] below.

TABLE 17

| DCI Format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of slot format |
| 2_1 | Notifying group of UEs of PRB(s) and OFDM symbol(s) where UE may assume that transmission is not intended for UE |
| 2_2 | Transmission of TPC commands for PUCCH and PUSCH |
| 2_3 | Transmission of group of TPC commands for SRS transmissions by one or more UEs |

In the 5G system, a search space of AL L in control resource set p and search space set s may be expressed as in Equation below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i$$ [Equation 2]

L: Aggregation Level $n_{CI}$: Carrier Index $N_{CCE,p}$: A total number of CCEs existing in control resource set p $n_{s,f}^{\mu}$: Slot Index $M^{(L)}_{p,s,max}$: The number of PDCCH candidate groups of aggregation level L $m_{s,n_{CI}}=0, \ldots, M^{(L)}_{p,s,max}-1$: An index of PDCCH candidate groups of aggregation level L $i=0, \ldots, L-1$ $Y_{p,n_{s,f}^{\mu}}=(A_p \cdot Y_{p,n_{s,f}^{\mu}-1}) \bmod D$, $Y_{p-1}=n_{s,f}\neq 0$, $A_0=39827$, $A_1=39829$, $A_2=39839$, $D=6533$:

$n_{RNTI}$: UE identifier

In a case of a common search space, $Y\_(p,n_{s,f}^{\mu})$ may be 0.

In a case of a UE-specific search space, $Y\_(p,n_{s,f}^{\mu})$ may be changed according to a time index and the identity (a C-RNTI or an ID configured for the UE by the BS) of the UE.

According to an embodiment of the present disclosure, a plurality of search space sets may be configured as different parameters (for example, the parameters in [Table 15]) in the 5G system. Accordingly, the search space set that the UE monitors may be different each time. For example, when search space set #1 is configured in an X-slot period, search space set #2 is configured in a Y-slot period, and X and Y are different from each other, the UE may monitor both search space set #1 and search space set #2 in a specific slot, and may monitor only one of search space set #1 and search space set #2 in another specific slot.

Meanwhile, the UL/DL HARQ in the NR system adopts an asynchronous HARQ scheme in which a data retransmission time point is not fixed. By using a DL as an example, when the BS has received a feedback of HARQ NACK from the UE in response to initially transmitted data, the BS randomly determines the retransmission data transmission time point according to a scheduling operation. After buffering data that has been determined as an error as a result of decoding of reception data for an HARQ operation, the UE may perform combining with next retransmission data. HARQ ACK/NACK information of the PDSCH transmitted in a subframe n−k may be transmitted from the UE to the BS via the PUCCH or the PUSCH in a subframe n. In the 5G communication system such as the NR system, a k value may be included in DCI for indicating or scheduling reception of the PDSCH transmitted in the subframe n−k and then transmitted, or may be configured for the UE by a higher-layer signal. In this case, the BS may configure one or more k values by a higher-layer signal, and may indicate a specific k value via the DCI, wherein k may be determined based on HARQ-ACK processing capacity of the UE, i.e., a minimum time required for the UE to receive the PDSCH and then to generate and report HARQ-ACK with respect to the PDSCH. In addition, before the k value is configured for the UE, the UE may use a pre-defined value or a default value.

Next, a resource area in which a data channel is transmitted in a 5G communication system will now be described below.

Figure 5:
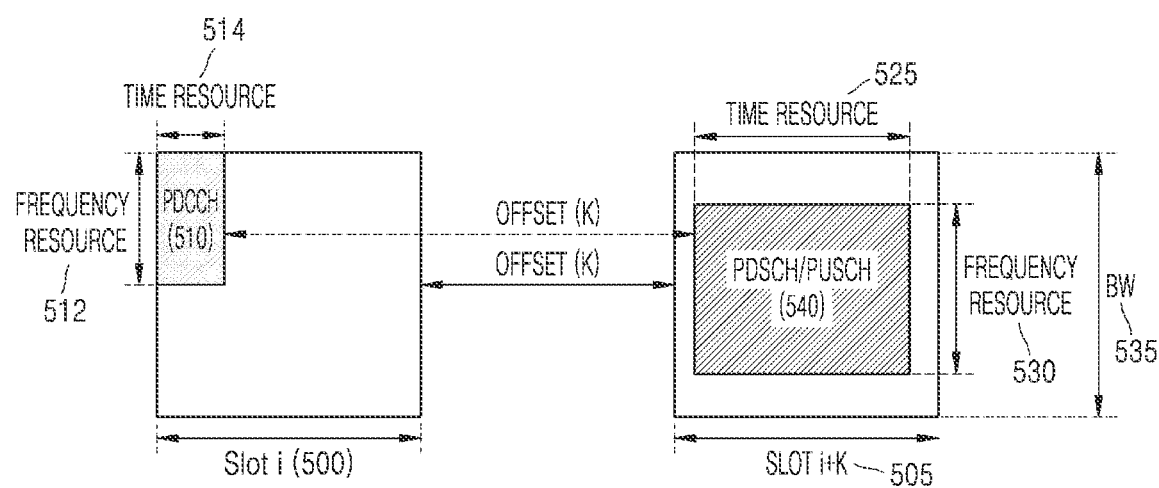
FIG. 5 illustrates a DL or UL scheduling method and resource area in an NR system according to an embodiment of the present disclosure.

FIG. 5 illustrates an example of a resource area in which a data channel is transmitted in the 5G communication system. In a DL control channel (hereinafter, referred to as a "PDCCH") area (hereinafter, referred to as a "control resource set (CORESET)" or a "search space (SS)") configured by a BS by a higher-layer signal, a UE monitors or searches for a PDCCH 510. In this case, the DL control channel area may include time-domain information 514 and frequency-domain information 512, the time-domain information 514 may be configured in units of symbols, and the frequency-domain information 512 may be configured in units of RBs or RB groups. When the UE detects the PDCCH 510 in a slot i 500, the UE obtains DL control information (DCI) transmitted via the detected PDCCH 510. The UE may obtain scheduling information associated with a DL data channel or an UL data channel from the received DL control information (DCI). In other words, the DCI may include information about a resource area (or a PDSCH transmission area) in which the UE is to receive a DL data channel (hereinafter, referred to as a "PDSCH") transmitted from the BS, or information about a resource area that is allocated to the UE, by the BS, for transmission of an UL data channel (a PUSCH). A case in which UL data channel (PUSCH) transmission is scheduled for the UE will be described as below. The UE that received DCI may obtain, from the DCI, a slot index or offset information K associated with reception of the PUSCH, and may determine a PUSCH transmission slot index. For example, the UE may determine that the UE is scheduled to transmit the PUSCH in a slot i+K 505, based on the offset information K, with reference to the slot index i 500 in which the PDCCH 510 is received. In this case, the UE may also determine the slot i+K 505 or a PUSCH start symbol or time in the slot i+K 505 by using the received offset information K, with reference to the received CORESET in which the PDCCH 510 is received. In addition, the UE may obtain, from the DCI, information associated with a PUSCH transmission time-frequency resource area 540 in a PUSCH transmission slot 505, wherein PUSCH transmission frequency resource area information 530 may be information in units of PRBs or PRB groups. The PUSCH transmission frequency resource area information 530 is an area included in an initial (UL) bandwidth (BW) 535 or an initial (UL) bandwidth part (BWP) 535 that is determined by the UE or is configured for the UE via an initial access procedure. When a BW or a BWP is configured for the UE by a higher-layer signal, the PUSCH transmission frequency resource area information 530 may be an area included in the BW or the BWP that is configured by the higher-layer signal.

The PUSCH transmission time resource area information 525 may be information in units of symbols or symbol groups, or may be information indicating absolute time information. In this case, the PUSCH transmission time resource area information 525 may be expressed as a combination of a PUSCH transmission start time or symbol and a PUSCH length, and a PUSCH end time or symbol, and may be included in the DCI as a field or value. Here, the PUSCH transmission time resource area information 525 may be included in the DCI as a field or a value expressing each of the PUSCH transmission start time or symbol and the PUSCH length, and the PUSCH end time or symbol. The UE may transmit the PUSCH in a PUSCH transmission resource area 540 determined based on the DCI.

The description of a frequency-domain resource allocation scheme for a data channel in the 5G communication system will be provided below.

Next, a scheme of configuring a beam to transmit control information and data to the UE by the BS will be described. For convenience of description in the present disclosure, a process of transmitting control information via a PDCCH may be represented in that a PDCCH is transmitted, and a process of transmitting data via a PDSCH may be represented in that a PDSCH is transmitted.

First, a beam configuration scheme will be described.

Figure 6:
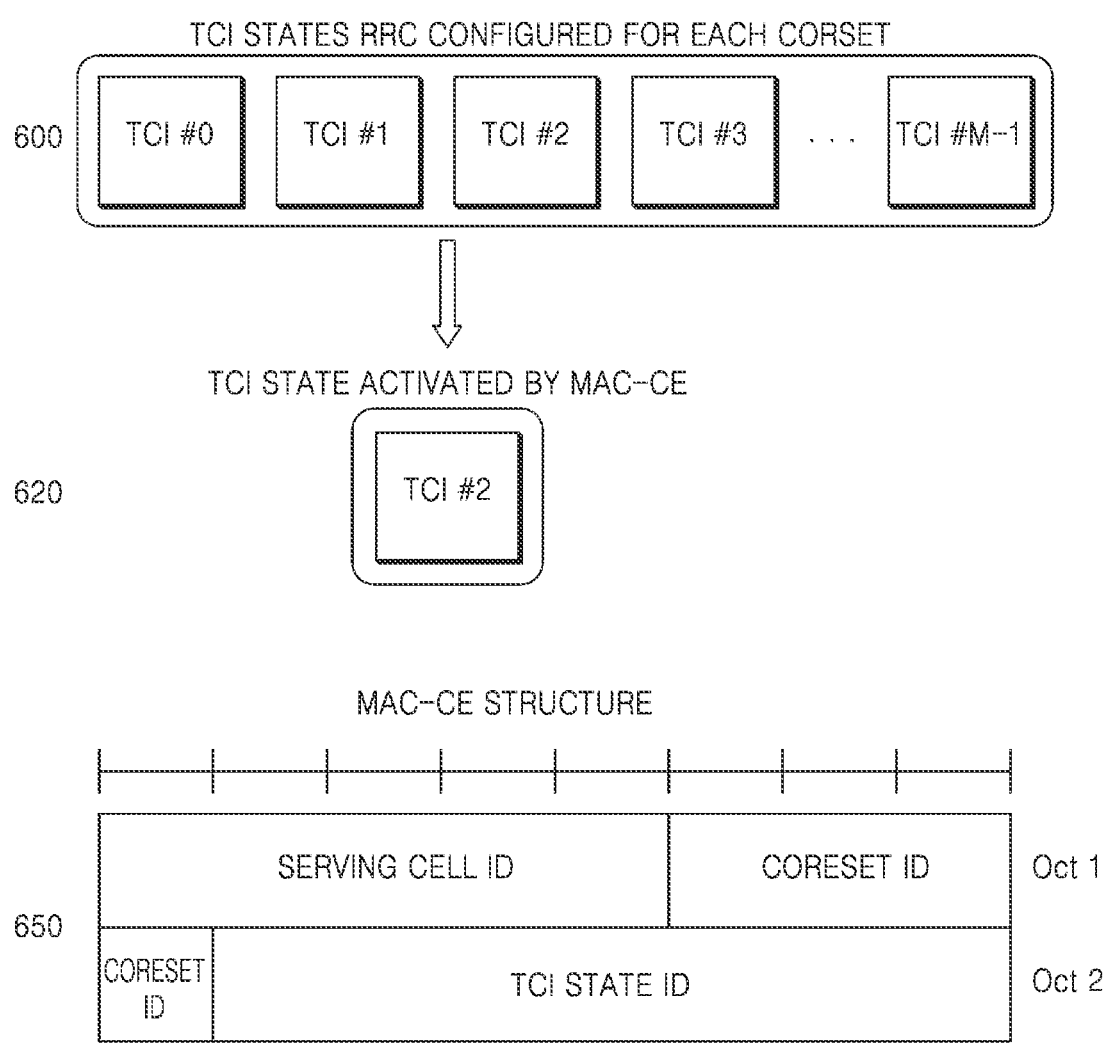
FIG. 6 illustrates a process of beam configuration and activation for a physical downlink control channel (PDCCH) according to an embodiment of the present disclosure.

FIG. 6 illustrates a process of beam configuration and activation for a PDCCH according to an embodiment of the present disclosure. First, a list of TCI states may be indicated for each CORESET via a higher-layer list such as RRC (operation 600). The list of TCI states may be indicated by "tci-StatesPDCCH-ToAddList" and/or "tci-StatesPDCCH-ToReleaseList". Next, a TCI state of one from the list of TCI states configured for each CORESET may be activated by the MAC-CE (operation 620). Operation 650 illustrates an example of a MAC-CE structure for TCI state activation. The meaning of each field and a value configured for each field in the MAC-CE are as below.

TABLE 18

Serving Cell Identifier (Serving Cell ID): This field indicates the identity of a Serving Cell to which the MAC CE applies. The length of the field is 5 bits;
CORESET Identifier (CORESET ID): This field indicates a Control Resource Set identified with ControlResourceSetId as specified in TS 38.331 [5], for which the TCI State is being indicated. In a case where a value of the field is 0, the field refers to the Control Resource Set configured by controlResourceSetZero as specified in TS 38.331 [5].

TABLE 18-continued

The length of the field is 4 bits;
Transmssion control indication Identifier (TCI State ID): This field indicates the TCI
state identified by TCI-StateId as specified in TS 38.331 [5] applicable to the Control
Resource Set identified by CORESET ID field. If the field of CORESET ID is set to 0,
this field indicates a TCI-StateId for a TCI state of the first 64 TCI-states configured by
tci-States-ToAddModList and tci-States-ToReleaseList in the PDSCH-Config of an active
BWP. When the field of CORESET ID is set to a value other than 0, this field indicates
TCI-StateId configured by tci-StatesPDCCH-ToAddList and tci-StatesPDCCH-
ToReleaseList in the controlResourceSet identified by the indicated CORESET ID. The
length of the field is 7 bits.

Next, a scheme of configuring a beam for a PDSCH will be described.

Figure 7:
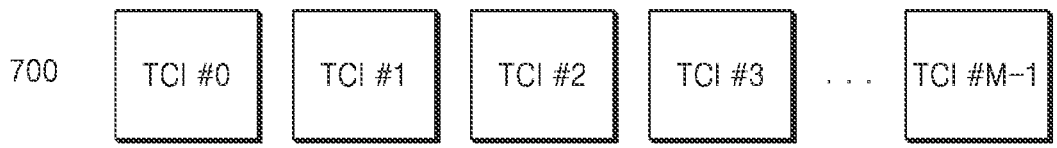
FIG. 7 illustrates a process of beam configuration and activation for a physical downlink shared channel (PDSCH) according to an embodiment of the present disclosure.
Figure 7:
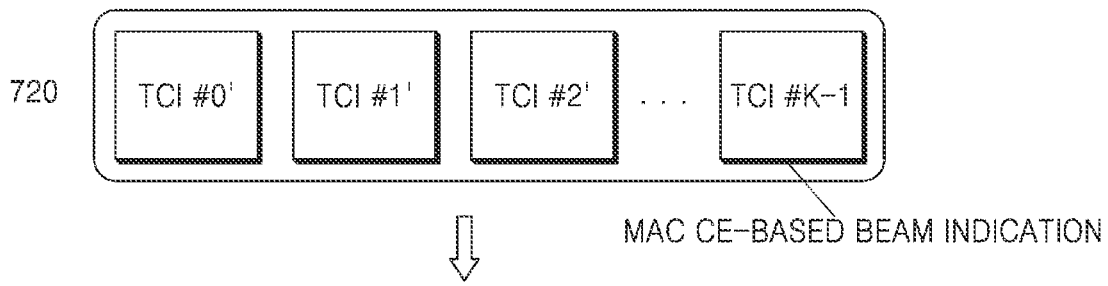
Figure 7:
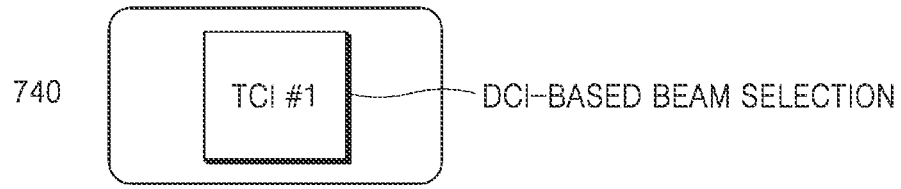

FIG. 7 illustrates a process of beam configuration and activation for a PDSCH according to an embodiment of the present disclosure.

First, a list of TCI states may be indicated via a higher-layer list such as RRC (operation 700). For example, the list of TCI states may be indicated by "tci-StatesToAddModList" and/or "tci-StatesToReleaseList" in a PDSCH-Config IE for each BWP. Next, some TCI states of the list of TCI states may be activated by the MAC-CE (operation 720). A maximum number of the activated TCI states may be determined according to a capability reported by a UE. Operation 750 illustrates an example of a MAC-CE structure for TCI state activation/deactivation of a Rel-15-based PDSCH.

The meaning of each field and a value configured for each field in the MAC-CE are as below.

TABLE 19

- Serving Cell Identifier (Serving Cell ID): This field indicates the identity of a Serving Cell
to which a MAC CE applies. The length of the field is 5 bits;
- Bandwidth Part Identifier (BWP ID): This field indicates a DL BWP to which the MAC
CE applies as the codepoint of the DCI bandwidth part indicator field as specified in TS 38.212
[9]. The length of the BWP ID field is 2 bits;
- TCI state Identifier i (Ti): When there is a TCI state with TCI-StateId i as specified in
TS 38.331 [5], this field indicates the activation/deactivation status of the TCI state with TCI-
StateId i, otherwise MAC entity may ignore the Ti field. The Ti field is set to 1 to indicate
that the TCI state with TCI-StateId i has to be activated and mapped to a codepoint of the
DCI Transmission Configuration Indication field, as specified in TS 38.214 [7]. The Ti field
is set to 0 to indicate that the TCI state with TCI-StateId i has to be deactivated and is not
mapped to the codepoint of the DCI Transmission Configuration Indication field. The
codepoint to which the TCI State is mapped is determined by its ordinal position from among
all the TCI States with Ti field set to 1, i.e., a first TCI State with Ti field set to 1 has to be
mapped to a codepoint value 0, a second TCI State with Ti field set to 1 has to be mapped to
the codepoint value 1 and so on. The maximum number of activated TCI states is 8;
- Reserved Bit (R): Reserved bit, set to 0.

When the UE has received DCI format 1_1 or DCI format 1_2, the UE may receive, based on transmission configuration indication (TCI) field information in DCI, a PDSCH by a beam of TCI states activated by the MAC-CE (operation 740). Whether the TCI field exists may be determined by a tci-PresentinDCI value indicating a higher-layer parameter in a CORESET configured for reception of the DCI. When tci-PresentinDCI is configured to be "enabled" in a higher layer, the UE may identify a TCI field having 3 bit information and may determine TCI states activated in a DL BWP or a scheduled component carrier and a direction of a beam associated with a DL-RS.

In order to further improve existing Rel. 16 of the 5G NR mobile communication system, in Rel. 17, control and data channel transmissions are being redesigned for better reliability and performance as they may be referred for the 3GPP RAN1 work item document (WID) for Rel-17 further-enhanced multiple input multiple output (FeMIMO). Such improvement is multiple transmission reception point (mTRP)-based reliability improvement for a PDCCH. The improvement focuses on improving the reliability of PDCCH by transmitting the same DCI from multiple TRPs (mTRP) via different multiplexing schemes. Similarly, further improvement on the reliability of UL control information (UCI) transmission is being considered by allowing the UE to transmit its UCI to multiple TRPs via repetitive (in time domain) PUCCH transmissions. Furthermore, reliability improvement for UL data transmission is also being considered by allowing the UE to transmit a PUSCH toward multiple TRPs.

For a case of PDCCH repetition, there are two scenarios that are the scenario in which a received PDCCH is in a same-frequency network (SFN) scheme and the scenario in which the received PDCCH is in a non-same frequency network (non-SFN) scheme.

For the SFN scheme, a CORESET used for PDCCH transmission is configured with one or more TCI state corresponding to different QCL parameters, where each PDCCH candidate of a monitored search space is mapped to at least one TCI state. Same PDCCH information is transmitted on the same time-frequency resource from each TRP. Upon reception of a PDCCH occasion, the UE performs channel estimation via a PDCCH DMRS port by considering a combined QCL parameter with respect to the configured TCI states.

For the non-SFN scheme, the PDCCH transmission is monitored over one or more search spaces associated with respective CORESETs with different TCI states corresponding to different QCL parameters. The same PDCCH information is transmitted via multiple transmission occasions from each TRP on different time resources as time division multiplexing (TDM) or on different frequency resources as frequency division multiplexing (FDM). When the PDCCH occasions are received from different search spaces, the UE performs channel estimation via a PDCCH DMRS port by considering different QCL parameters over each occasion, with respect to the configured TCI states.

A PDSCH carries data from the gNodeB (gNB) to UEs. In the present disclosure, 3GPP defined two mapping types of PDSCH, i.e., PDSCH mapping type A and type B. While both PDSCH mapping types A and B enable same slot scheduling implying that a PDCCH scheduling a PDSCH may be in a same slot as the scheduled PDSCH, more flexibility in terms of relative locations between PDCCH and PDSCH and location of DM-RS is rendered via PDSCH mapping type B, compared to type A. Therefore, PDSCH mapping type B reduces the scheduling delay and thus may be applied to delay sensitive use cases such as ultra-reliable low latency communication (uRLLC).

In Rel. 16 NR, a reference point to indicate time domain resource allocation (TDRA) of PDSCH mapping type B may be a start symbol of the scheduling PDCCH. In this regard, when a PDCCH is repeated in a TDMed manner including same DCI to schedule PDSCH mapping type B, it is not specified which PDCCH repetition is considered for TDRA reference. As described in detail in the present disclosure, considering the first or latter repetitions of PDCCH in time domain as a reference repetition may affect various aspects including allowable duration of PDSCH, DM-RS shifting rules, UE buffering requirements, and the like. Based on the considerations, the present disclosure provides various solutions associated with the TDRA reference for PDSCH mapping type-B upon reception of repetitive PDCCH.

Moreover, in Rel. 16, DM-RS shifting rules for determining OFDM symbols on which a first DM-RS of PDSCH is transmitted are specified. In general, when transmission of the first DM-RS of PDSCH collides with PDCCH transmission, the first DM-RS of PDSCH is shifted to a next symbol. This shifting is continued until there are no such collisions, and thus, the first DM-RS symbol occurs immediately after the PDCCH area (CORESET). The aforementioned shifting rules with additional restrictions are specified in 3GPP 38.211 by assuming single PDCCH transmission for scheduling a PDSCH.

However, when a PDCCH for scheduling PDSCH is repeated, a DM-RS shifting rule based on the first PDCCH cannot resolve all possible collisions between PDCCH and DM-RS of the scheduled PDSCH. In order to resolve the possible collisions between PDCCH and DM-RS of the scheduled PDSCH while maintaining DM-RS time-density to a reasonable level, the present disclosure provides various rules and considerations.

In addition to the DM-RS shifting rule in PDSCH mentioned above, the following DM-RS Mapping Restrictions are specified in Rel. 16 as it can be referred in 3GPP 38.211 [8].

If the PDSCH duration $I_d$ is 2 symbols, the UE does not expect to receive DM-RS symbol after the second symbol;

if the PDSCH duration $I_d$ is 5 symbols and if one additional single-symbol DMRS is configured, the UE expects the additional DM-RS to be transmitted on the fifth symbol;

if the PDSCH duration $I_d$ is 7 symbols for normal CP or 6 symbols for extended CP:
  the UE does not expect to receive the front-loaded DM-RS after the fourth symbol, and
  when one additional single-symbol DM-RS is configured, the UE only expects the additional DM-RS to be transmitted on the 5th or 6th symbol when the front-loaded DM-RS symbol is only in the 1st or 2nd symbol of the PDSCH duration, otherwise the UE should expect that the additional DM-RS is not transmitted;

when the PDSCH duration $I_d$ is 12 or 13 symbols, the UE is not expected to receive a DM-RS symbol mapped to symbol 12 or later in the slot;

for all values of the PDSCH duration $I_d$ other than 2, 5, and 7 symbols, the UE does not expect to receive a DM-RS symbol after the $(I_d-1)$th symbol;

if the higher-layer parameter lte-CRS-ToMatchAround, lte-CRS-PatternList1, or lte-CRS-PatternList2 is configured, the PDSCH duration $I_d$=10 symbols for normal CP, the subcarrier spacing configuration $\mu$=0, single-symbol DM-RS is configured, and at least one PDSCH DM-RS symbol in the PDSCH allocation collides with a symbol including resource elements as indicated by the higher-layer parameter lte-CRS-ToMatchAround, lte-CRS-PatternList1, or lte-CRS-PatternList2, then Cambria Math has to be increased by one in all slots.

The time domain resource mapping for PDSCH is given by DCI in the PDCCH that schedules the PDSCH via a time domain resource allocation field value m. The value m provides a row index of resource allocation table in 3GPP 38.214 which includes the slot offset $K_0$, the start and length identifier value (SLIV), or directly the start symbol S and the allocation length L, and the PDSCH mapping type to be assumed in the PDSCH reception.

Figure 8:
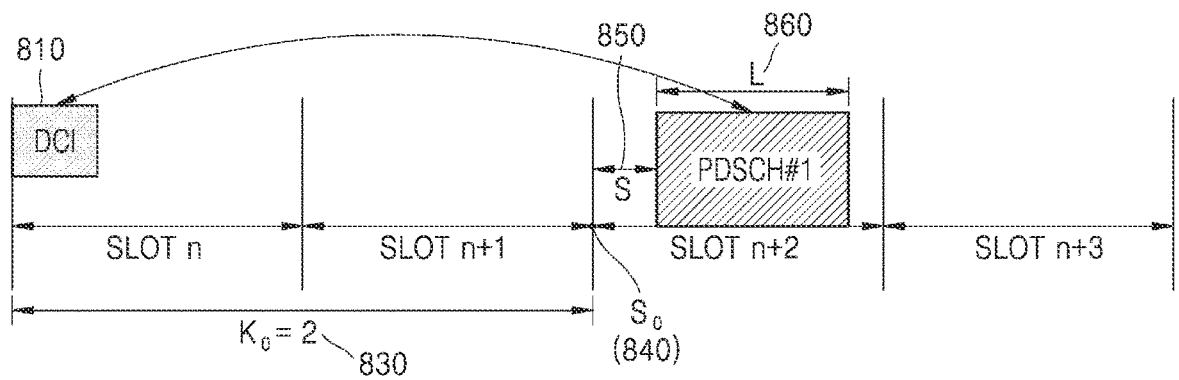
FIG. 8 illustrates an example for inter-slot scheduling of a PDSCH by downlink control information (DCI) received in a separate slot according to an embodiment of the present disclosure.

A specific example of time domain resource allocation for scheduling PDSCH type-A is given in FIG. 8. FIG. 8 shows that DCI 810 in slot n schedules a PDSCH 860 that is scheduled to be later by $K_0$=2 slots 830, compared to DCI 810. For example, a slot offset $K_0$ corresponding to the PDSCH 860 is equal to a value of 2. Moreover, the scheduled PDCSH starts in symbol S 850 relative to a reference symbol $S_0$ 840 that refers to a start of a slot, i.e., slot n+2, in which the PDSCH 860 starts.

Figure 9:
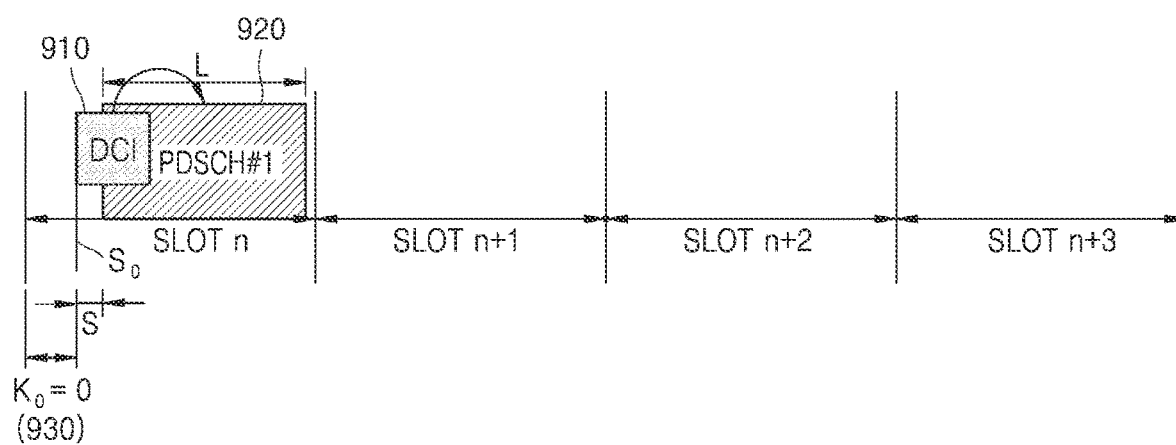
FIG. 9 illustrates an example for same-slot scheduling of a PDSCH by DCI received in a same slot according to an embodiment of the present disclosure.

A specific example of time domain resource allocation for scheduling PDSCH type-B is provided in FIG. 9. Referring to FIG. 9, it is shown that DCI 910 in a slot n schedules a PDSCH 920 in a same slot, i.e., $K_0$=0 930, as DCI 910. Moreover, the scheduled PDSCH starts in symbol S relative to a reference symbol $S_0$ that refers to a start of PDCCH occasion that includes DCI 910 to schedule PDSCH 920. This type of scheduling may be referred to as same-slot scheduling.

Figure 10:
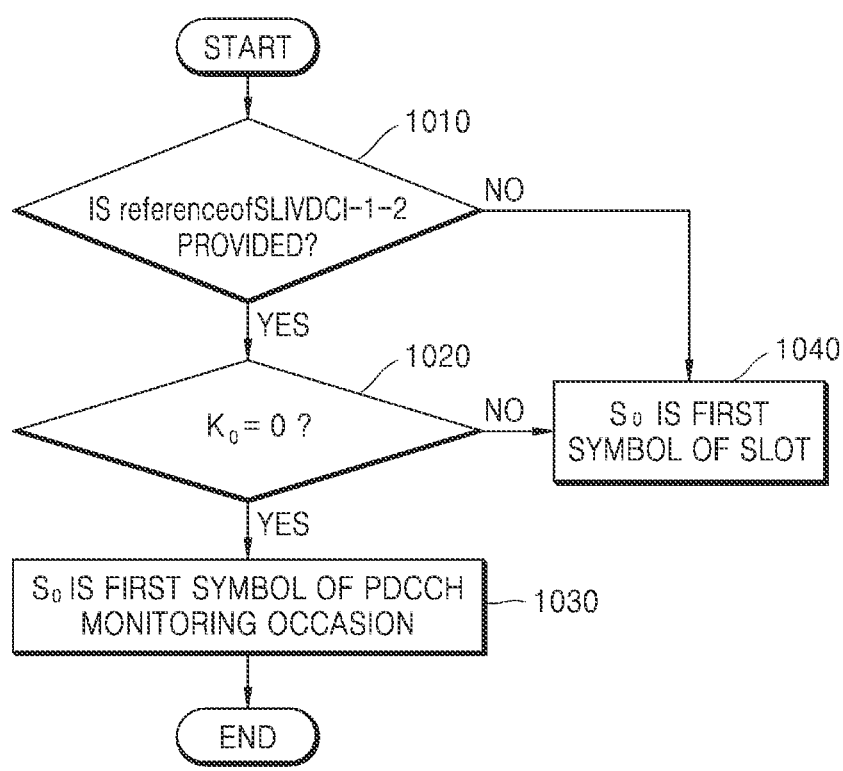
FIG. 10 illustrates a flowchart for obtaining a reference symbol S$_0$ of PDSCH scheduling according to an embodiment of the present disclosure.

The reference symbol $S_0$ for PDSCH scheduling is determined based on an RRC IE refrenceOFSLIVDCI-1-2 included in PDSCH-Config. The flowchart related to determining of the reference symbol $S_0$ is provided in FIG. 10.

In operation 1010, a UE may determine whether information associated with referenceOFSLIVDCI-1-2 is provided. For example, the UE may determine whether an RRC IE associated with referenceOFSLIVDCI-1-2 is transmitted from a BS. For example, referenceOFSLIVDCI-1-2 may indicate an RRC IE associated with a time-domain resource allocation field.

Referring to FIG. 10, it is shown that, when referenceOFSLIVDCI-1-2 is provided ('Yes' in operation 1010), in operation 1020, the UE may determine whether a slot offset $K_0$ for PDSCH scheduling is equal to 0.

In operation 1030, when the slot offset $K_0$ for PDSCH scheduling is 0 ('Yes' in operation 1020), that is, $K_0$=0, the UE may determine that the reference symbol $S_0$ indicates a first symbol of a PDCCH monitoring occasion for receiving DCI to schedule a PDSCH.

On the other hand, when referenceOFSLIVDCI-1-2 is not provided ('NO' in operation 1010), in operation 1040, the UE may determine that the reference symbol $S_0$ always indicates the start of a slot, i.e., $S_0=0$, in which a PDSCH starts.

In a case where referenceOFSLIVDCI-1-2 is provided but the slot offset $K_0$ for PDSCH scheduling is not equal to 0 ('No' in operation 1020), i.e., $K_0 \neq 0$, in operation 1040, the UE may determine that the reference symbol $S_0$ indicates the start of a slot, that is, $S_0=0$, in which a PDSCH starts.

When a PDSCH is scheduled by DCI transmitted via a plurality of PDCCH repetitions, a PDSCH start reference symbol is unclear. In this regard, two reference symbols may be considered.

When a type-B PDSCH is scheduled by DCI transmitted via repetitive PDCCH and referenceOFSLIVDCI-1-2 is provided in RRC configuration with a slot offset set to 0, i.e., $K_0=0$, Method I.1 provides a start symbol S that refers to a start reference symbol $S_0$ of a first PDCCH monitoring occasion in which first repetition of DCI is transmitted.

Method I.2 provides a start symbol S that refers to a start reference symbol $S_0$ of a second PDCCH monitoring occasion in which second repetition of DCI is transmitted.

Figure 11A:
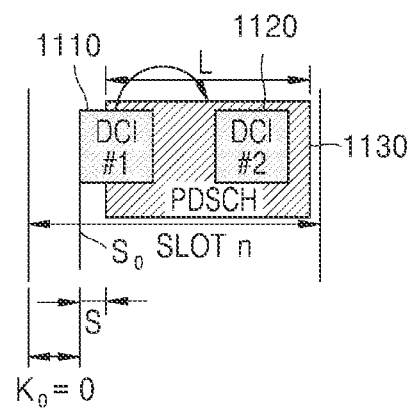
FIGS. 11A and 11B illustrate an exemplary example of Method I.1 and Method I.2 that are disclosed methods according to an embodiment of the present disclosure.

An example in drawing related to Method I.1 is provided in FIG. 11A. FIG. 11A shows that a start symbol S for a PDSCH 1130 is measured from a start reference symbol $S_0$ of a PDCCH monitoring occasion in which first DCI 1110 is detected.

Method I.1 has advantage in terms of resource usage as a length of PDSCH schedule by Method I.1 may have a length up to 14–$S_0$. This means that longer PDSCH transmissions may be supported by Method I.1. In this respect, when the UE detects DCI by soft-combining DCI #1 1110 and DCI #2 1120, it means that the UE has to buffer PDSCH transmission until the UE decodes DCI #2 1120.

Moreover, even when the UE detects DCI by separately decoding DCI #1 1110 and then DCI #2 1120, if the decoding of DCI #1 1110 fails, Method I.1 still requires the UE to buffer a PDSCH until DCI #2 1120 is correctly decoded. Otherwise, the PDSCH transmission may be lost until DCI #2 1120 is correctly decoded.

Figure 11B:
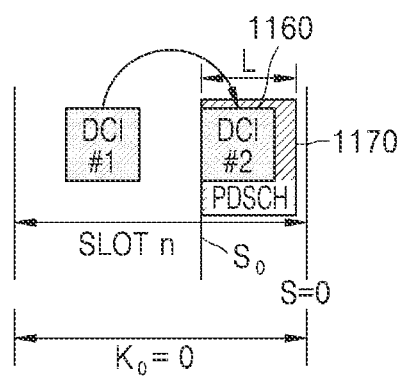

An example in drawing related to Method I.2 is provided in FIG. 11B. FIG. 11B shows that a start symbol S for a PDSCH 1170 is measured from a start reference symbol S0 of a PDCCH monitoring occasion in which second DCI 1160 is transmitted. Method I.2 has advantage in terms of lesser burden to the UE to decode PDSCH. In particular, as the UE expects a PDSCH to be transmitted after a start symbol of DCI #2 1160, a PDSCH buffering requirement is decreased.

Moreover, Method I.2 does not require any additional rule for collisions between PDCCH and DM-RS of the scheduled PDSCH, other than the existing set of rules as described above. However, Method I.2 supports only shorter PDSCH lengths, as compared to Method I.1. Therefore, in terms of resource usage, Method I.2 has disadvantage. Moreover, as a decoding process may start only after a start symbol of DCI #2 1160, there may be additional delay associated with decoding PDSCH with Method I.2

As indicated above, when Method I.1 is employed as PDSCH mapping when a PDSCH is scheduled by repetitive PDCCH, then a new set of rules are required to avoid collisions between PDCCH and DM-RS of the scheduled PDSCH. In this regard, the present disclosure provides a plurality of methods to resolve possible collisions between PDCCH and DM-RS of the scheduled PDSCH.

Method II.1: When any one of DM-RSs of PDSCH allocation collides with resources reserved for a search space set associated with a CORESET, positions ($\ddot{l}$) of DM-RS symbols have to be increased such that the DM-RS symbol (s) collided with PDCCH occur immediately after the CORESET and until collision with a random CORESET does not occurs.

Figure 12A:
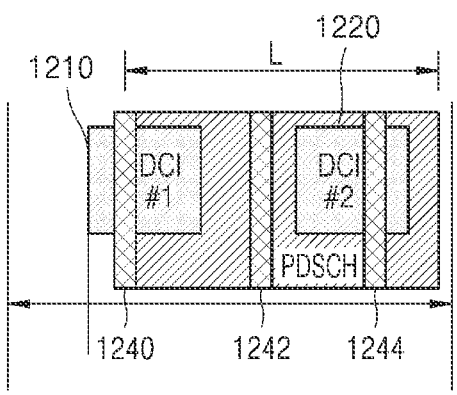
FIGS. 12A and 12B illustrate an example for demodulation reference signal (DM-RS) shifting rule based on Method II.1 that is the disclosed method according to an embodiment of the present disclosure.
Figure 12B:
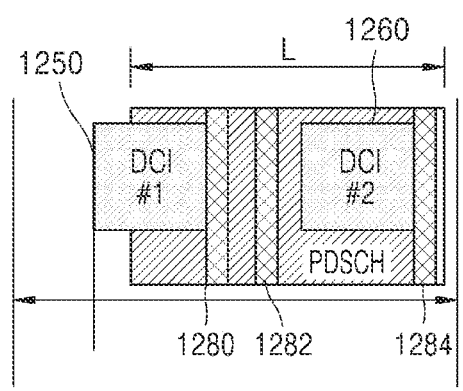

A specific example of Method II.1 is provided in FIGS. 12A and 12B. In FIG. 12A, both DCI #1 1210 and DCI #2 1220 respectively collide with DM-RS symbols 1240 and 1244. Then, by applying Method II.1 and as shown in FIG. 12B, DM-RSs 1280 and 1284 are shifted to the right in the time domain until any collisions with respective CORESETs are avoided. For example, DM-RSs 1280 and 1284 may also be shifted in the frequency domain until any collisions with respective CORESETs are avoided Method II.2: When any one of DM-RSs of PDSCH allocation collides with resources reserved for a search space set associated with a CORESET carrying second and subsequent repetitions of DCI for scheduling a PDSCH, positions ($\ddot{l}$) of DM-RS symbols have to be decreased such that the DM-RS symbol(s) collided with PDCCH occur immediately before the CORESET and until collision with a random CORESET does not occurs.

Figure 13A:
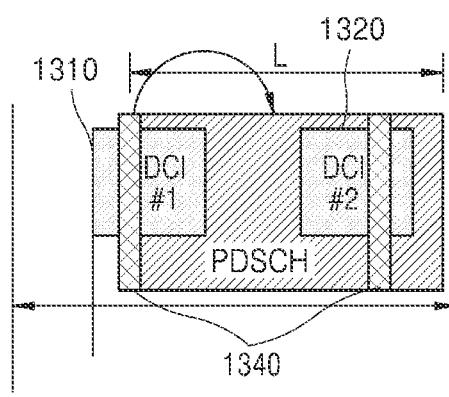
FIGS. 13A and 13B illustrate an example for DM-RS shifting rule based on Method II.2 that is the disclosed method according to an embodiment of the present disclosure.
Figure 13B:
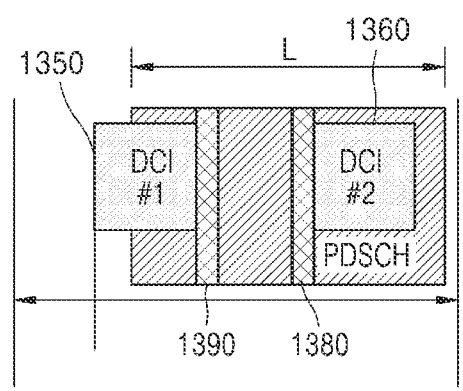

A specific example of Method II.2 is provided in FIGS. 13A and 13B. In FIG. 13A, both DCI #1 1310 and DCI #2 1320 respectively collide with DM-RS symbols 1340. Then, by applying Method II.2 and as shown in FIG. 13B. DM-RS 1380 colliding with DCI 1360 is shifted to the left in the time domain until any collisions with respective CORESETs are avoided.

Furthermore, in a case of DM-RS 1390 colliding with first DCI 1350, i.e., a position of DM-RS 1390 is shifted to the right in the time domain until any collision is avoided.

Method II.3: When any one of DM-RSs of PDSCH allocation collides with resources reserved for a search space set associated with a CORESET carrying second and subsequent repetitions of DCI for scheduling a PDSCH, positions (1) of DM-RS symbols have to be increased or decreased to do the followings.

The DM-RS time-domain density, i.e., the number of DMRS symbols in PDSCH is maximized (first rule)

The DMRS symbol(s) are evenly distributed in the time domain by maximizing a minimum distance between adjacent DM-RS symbols. (second rule)

A minimum distance between adjacent DM-RS symbols in PDSCH has to be greater than X symbols, where $X \in \{0, 1, 2, \ldots, 12\}$; otherwise, the DM-RS symbol in PDSCH has to be discarded. (third rule)

The above three rules may be applied in a sequential manner. Regarding X in the third rule, it may be predefined in the specification, may be configured by a higher layer, or may be dynamically indicated.

The DMRS shifting may be employed in repetitive manner starting from a first DMRS until the DM-RS symbol collided with PDCCH occurs immediately after or before the CORESET and until no collision with any CORESET occurs.

The aforementioned DM-RS Mapping Restrictions in 3GPP 38.211 may be considered in association with the disclosed methods that are Method II.1, Method II.2 and Method II.3.

Figure 14A:
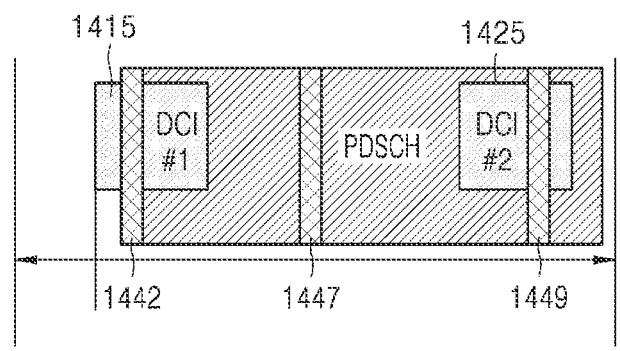
FIGS. 14A and 14B illustrate an example for DM-RS shifting rule based on Method II.3 that is the disclosed method according to an embodiment of the present disclosure.
Figure 14B:
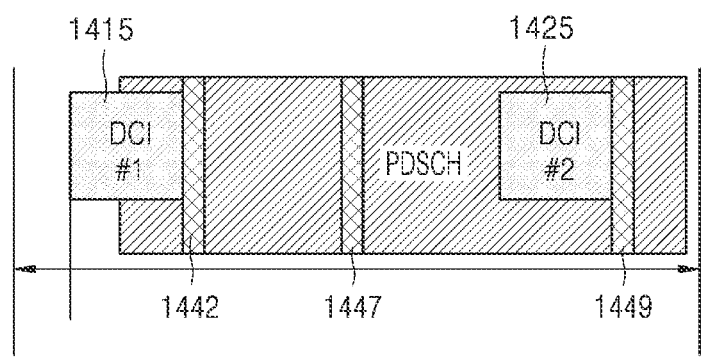

FIGS. 14A and 14B illustrate a specific example of Method II.3. Referring to FIG. 14A, a front loaded DM-RS 1442 collided with DCI #1 1415 is shifted to the right in the time domain, referring to FIG. 14B, until the DM-RS 1442 occurs immediately after DCI #1 1415. Shifting the DM-RS

1442 to the left would reduce the number of DM-RS symbols in a PDSCH and thus may decrease DM-RS density.

Moreover, a second DM-RS 1447 is not shifted as it is not collided with any PDCCH monitoring occasion.

However, referring to FIG. 14A, a third DM-RS 1449 is collided with DCI #2 1425, and thus, referring to FIG. 14B, the shifted third DM-RS 1449 is shifted to the right such that it occurs immediately after DCI #2 1425. Shifting the DM-RS 1449 to the left may decrease a minimum distance between DM-RS symbols.

Figure 14C:
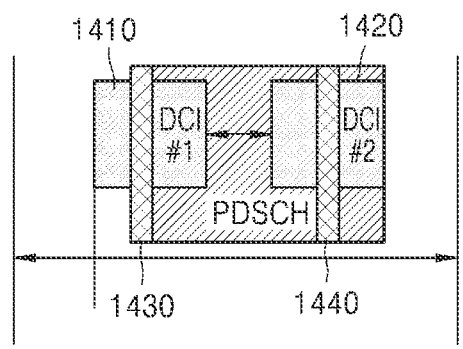
FIGS. 14C and 14D illustrate a specific example of DM-RS dropping as a result of rule based on Method II.3 that is the disclosed method according to an embodiment of the present disclosure.
Figure 14D:
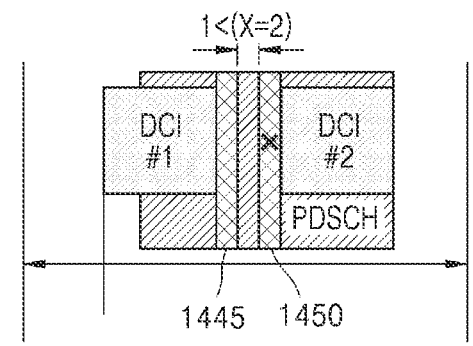

FIGS. 14C and 14D illustrate an example in which a DM-RS is discarded based on Method II.3. In the example, referring to FIG. 14C, two DM-RSs 1430 and 1440 of a PDSCH are collided with two DCIs 1410 and 1420 that respectively schedule the DM-RSs. According to Method II.3, the first and second DM-RSs 1430 and 1440 may be shifted respectively to the right and the left until any collisions with DCIs are avoided. However, referring to FIG. 14D, when a minimum distance between adjacent DM-RSs is set to 2, i.e., X=2, then, a second DM-RS 1450 has to be discarded as a distance between first and second DM-RSs 1445 and 1450 would be only one symbol.

Method III: When a PDSCH type B is scheduled by DCI transmitted via repetitive PDCCH and referenceOfSLIVDCI-1-2 is provided in RRC configuration with a slot offset set to 0, i.e., $K_0$=0, a UE selects between Method I.1 or Method I.2 based on UE capability-based RRC configuration. The detail descriptions of Method III from UE and gNB perspective are described with flowcharts in FIGS. 15 and 16, respectively.

Figure 15:
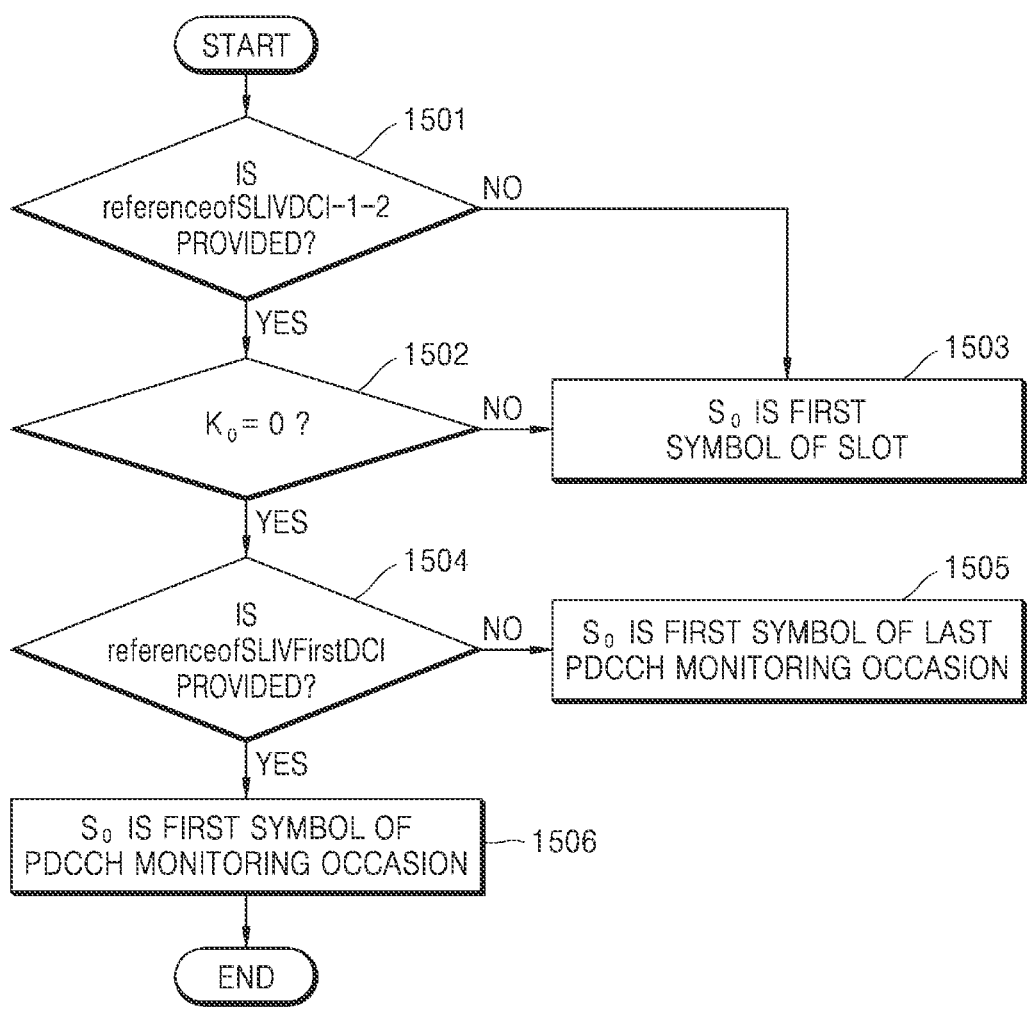
FIG. 15 illustrates a flowchart for UE-side operation for obtaining a PDSCH start reference symbol S$_0$ according to Method Ill that is the disclosed method according to an embodiment of the present disclosure.

Referring to FIG. 15, in operation 1501, a UE may determine whether RRC IE referenceOfSLIVDCI-1-2 is provided.

Then, in a case where RRC IE referenceOfSLIVDCI-1-2 is provided ('Yes' in operation 1501), in operation 1502, the UE may determine whether the slot offset $K_0$ for PDSCH scheduling is 0.

When the slot offset $K_0$ for PDSCH scheduling is 0 ('Yes' in operation 1502), in operation 1504, the UE may determine whether new RRC IE associated with "referenceOfSLIVFirstDCI" is provided. For example, referenceOfSLIVFirstDCI may indicate an RRC IE associated with a PDCCH monitoring occasion corresponding to a reference symbol $S_0$.

When $K_0$=0 and new IE referenceOfSLIVFirstDCI is provided ('Yes' in operation 1504), the UE may determine that the reference symbol $S_0$ is a first symbol of a first PDCCH monitoring occasion, i.e., Method I.1.

Otherwise, RRC IE referenceOfSLIVDCI-1-2 is provided and $K_0$=0 but new IE referenceOfSLIVFirstDCI is not provided ('No' in operation 1504), in operation 1505, the UE may determine that the reference symbol $S_0$ is a first symbol of a last PDCCH monitoring occasion, i.e., Method I.2.

When RRC IE referenceOfSLIVDCI-1-2 is not provided ('No' in operation 1501), in operation 1503, the UE may determine that the reference symbol $S_0$ indicates a start of a slot in which a PDSCH starts, i.e., $S_0$=0.

In a case where legacy IE referenceOfSLIVDCI-1-2 is provided but the slot offset $K_0$ is not equal to 0 ('No' in operation 1502), in operation 1503, the UE may determine that the reference symbol $S_0$ indicates a start of a slot in which a PDSCH starts, i.e., $S_0$=0.

Without limiting general applicability of the present disclosure, reported UE capability may be one of the following:

UE capability in terms of PDSCH data buffering that may be expressed in terms of X PDSCH symbols that may be buffered before last DCI is detected UE capability in terms of determining a start symbol of PDSCH UE capability in terms of supporting PDCCH repetition UE capability in terms of supporting soft combining decoding The descriptions above are not a comprehensive list of possible UE capability reporting, and thus, a capability reporting that is not listed above may be applied in association with the disclosed methods.

Figure 16:
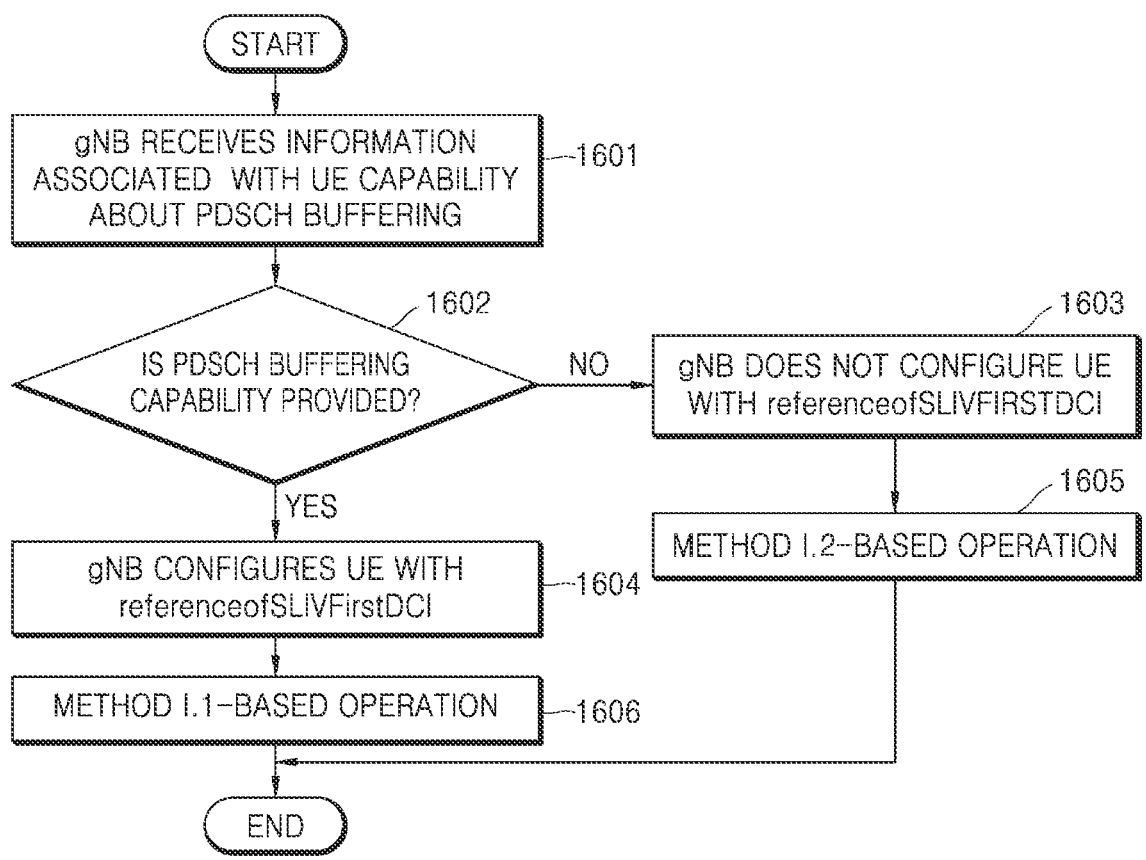
FIG. 16 illustrates a flowchart for gNB-side operation for configuring a PDSCH start reference symbol S$_0$ according to Method III that is the disclosed method according to an embodiment of the present disclosure.

FIG. 16 provides a gNB-side flowchart for configuring a UE behavior with respect to a PDSCH start symbol when a PDSCH is scheduled by repetitive DCI.

Referring to FIG. 16, in operation 1601, a gNB may receive, from a UE, information associated with UE capability about PDSCH buffering.

In operation 1602, the gNB may determine whether PDSCH buffering capability is provided from the received information associated with the UE capability about PDSCH buffering.

In operation 1604, when the PDSCH buffering capability is provided from the received information associated with the UE capability about PDSCH buffering ('Yes' in operation 1602), in operation 1604, the gNB may configure the UE with referenceOfSLIVFirstDCI, and in operation 1606, Method I.1-based operations are performed. For example, when a plurality of PDCCHs are repeated, the gNB may provide a start symbol S that refers to a start reference symbol $S_0$ of a first PDCCH monitoring occasion.

When the UE does not indicate its capability of buffering a PDSCH ('No' in operation 1602), in operation 1603, the gNB may not configure the UE with referenceOfSLIVFirstDCI, and in operation 1605, Method 1.2-based operations are initiated. For example, when a plurality of PDCCHs are repeated, the gNB may provide a start symbol S that refers to a start reference symbol $S_0$ of a last PDCCH monitoring occasion.

According to an embodiment of the present disclosure, a method performed by a UE in a wireless communication system may be provided. The method may include: receiving, from a BS, an RRC message including a parameter associated with using a start symbol of a PDCCH monitoring occasion as a reference of a SLIV; determining, based on the parameter, when a PDSCH is scheduled by DCI transmitted via repetitive first PDCCH candidate and second PDCCH candidate, a reference symbol associated with a start symbol of the PDSCH by using the second PDCCH candidate starting after the first PDCCH candidate; and receiving, based on the reference symbol, downlink data via the PDSCH from the BS.

According to an embodiment, a value of a slot offset corresponding to the PDSCH may be zero.

According to an embodiment, a time-domain resource mapping type for the PDSCH may be set to Type B.

According to an embodiment, the DCI may correspond to DCI format 1_2.

According to an embodiment, the determining of the reference symbol may include determining, as the reference symbol, a start symbol of a monitoring occasion for the second PDCCH candidate.

According to an embodiment of the present disclosure, a UE in a wireless communication system may be provided. The UE may include: a transceiver; and at least one processor configured to receive, via the transceiver from a BS, an RRC message including a parameter associated with using a start symbol of a PDCCH monitoring occasion as a reference of a SLIV, determine, based on the parameter, when a PDSCH is scheduled by DCI transmitted via repetitive first PDCCH candidate and second PDCCH candidate, a reference symbol associated with a start symbol of the PDSCH by using the second PDCCH candidate starting after the first PDCCH candidate, and receive, via the transceiver, based on the reference symbol, downlink data via the PDSCH from the BS.

According to an embodiment, a value of a slot offset corresponding to the PDSCH may be zero.

According to an embodiment, a time-domain resource mapping type for the PDSCH may be set to Type B.

According to an embodiment, the DCI may correspond to DCI format 1_2.

According to an embodiment, the at least one processor may be configured to determine, as the reference symbol, a start symbol of a monitoring occasion for the second PDCCH candidate.

According to an embodiment of the present disclosure, a method performed by a BS in a wireless communication system may be provided. The method may include: transmitting, to a UE, an RRC message including a parameter associated with using a start symbol of a PDCCH monitoring occasion as a reference of a SLIV; determining, based on the parameter, when a PDSCH is scheduled by DCI transmitted via repetitive first PDCCH candidate and second PDCCH candidate, a reference symbol associated with a start symbol of the PDSCH by using the second PDCCH candidate starting after the first PDCCH candidate; and transmitting, based on the reference symbol, downlink data via the PDSCH to the UE.

According to an embodiment, a value of a slot offset corresponding to the PDSCH may be zero.

According to an embodiment, a time-domain resource mapping type for the PDSCH may be set to Type B.

Figure 17:
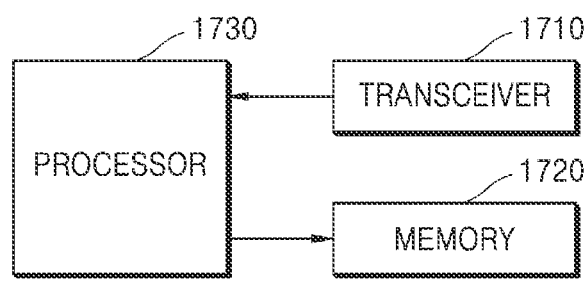
FIG. 17 is a block diagram illustrating a structure of a UE according to an embodiment of the present disclosure.

FIG. 17 is a block diagram illustrating a structure of a UE according to an embodiment of the present disclosure.

As illustrated in FIG. 17, the UE may include a transceiver 1710, a memory 1720, and a processor 1730. According to the communication method of the UE described above, the processor 1730, the transceiver 1710 and the memory 1720 of the UE may operate. However, elements of the UE are not limited to the example above. For example, the UE may include more elements than those described above or may include fewer elements than those described above. In addition, the processor 1730, the transceiver 1710 and the memory 1720 may be implemented as one chip.

The transceiver 1710 collectively refers to a receiver of the UE and a transmitter of the UE, and may transmit or receive signals to or from a BS or a network entity. The signals being transmitted or received to or from the BS may include control information and data. To this end, the transceiver 1710 may include a RF transmitter for up-converting and amplifying a frequency of signals to be transmitted, and an RF receiver for low-noise-amplifying and down-converting a frequency of received signals. However, this is merely an example of the transceiver 1710, and elements of the transceiver 1710 are not limited to the RF transmitter and the RF receiver.

Also, the transceiver 1710 may include a wired/wireless transceiver, and may include various configurations for transmitting and receiving signals.

Also, the transceiver 1710 may receive signals via wired/wireless channels and output the signals to the processor 1730, and may transmit signals output from the processor 1730, via wired/wireless channels.

Also, the transceiver 1710 may receive and output a communication signal to the processor, and may transmit a signal output from the processor to the network entity via a wired/wireless network.

The memory 1720 may store programs and data required for the UE to operate. Also, the memory 1720 may store control information or data included in a signal obtained by the UE. The memory 1720 may include any or a combination of storage media such as read only memory (ROM), random access memory (RAM), a hard disk, a compact disc (CD)-ROM, a digital versatile disc (DVD), or the like.

Also, the processor 1730 may control a series of processes to allow the UE to operate according to the embodiments of the present disclosure. Also, the processor 1730 may include one or more processors. For example, the processor 1730 may include a CP for controlling communications and an AP for controlling an upper layer such as an application program.

Figure 18:
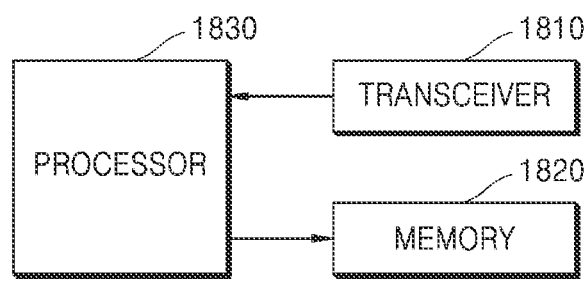
FIG. 18 is a block diagram illustrating a structure of a base station (BS) according to an embodiment of the present disclosure.

FIG. 18 is a block diagram illustrating a structure of a BS according to an embodiment of the present disclosure.

As illustrated in FIG. 18, the BS may include a transceiver 1810, a memory 1820, and a processor 1830. According to the communication method of the BS described above, the processor 1830, the transceiver 1810 and the memory 1820 of the BS may operate. However, elements of the BS are not limited to the example above. For example, the BS may include more elements than those described above or may include fewer elements than those described above. In addition, the processor 1830, the transceiver 1810 and the memory 1820 may be implemented as one chip.

The transceiver 1810 collectively refers to a receiver of the BS and a transmitter of the BS, and may transmit or receive signals to or from a UE or another BS. The signals being transmitted or received may include control information and data. To this end, the transceiver 1810 may include a RF transmitter for up-converting and amplifying a frequency of signals to be transmitted, and an RF receiver for low-noise-amplifying and down-converting a frequency of received signals. However, this is merely an example of the transceiver 1810, and elements of the transceiver 1810 are not limited to the RF transmitter and the RF receiver. Also, the transceiver 1810 may include a wired/wireless transceiver, and may include various configurations for transmitting and receiving signals.

Also, the transceiver 1810 may receive signals via communication channels (e.g., wireless channels) and output the signals to the processor 1830, and may transmit signals output from the processor 1830, via communication channels.

Also, the transceiver 1810 may receive and output a communication signal to the processor, and may transmit a signal output from the processor to the UE or the network entity via a wired/wireless network.

The memory 1820 may store programs and data required for the BS to operate. Also, the memory 1820 may store control information or data included in a signal obtained by the BS. The memory 1820 may include any or a combination of storage media such as ROM, RAM, a hard disk, a CD-ROM, a DVD, or the like.

Also, the processor 1830 may control a series of processes to allow the BS to operate according to the embodiments of the present disclosure. Also, the processor 1830 may include one or more processors. The methods according to the embodiments of the present disclosure as described in claims or specification may be implemented as hardware, software, or a combination of hardware and software.

The methods according to the embodiments of the present disclosure as described in claims or specification may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments of the present disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the present disclosure. Furthermore, a separate storage device on the communication network may access the electronic device performing the embodiments of the present disclosure.

In the afore-described embodiments of the present disclosure, elements included in the present disclosure are expressed in a singular or plural form according to the embodiments of the present disclosure. However, the singular or plural form is appropriately selected for convenience of explanation and the present disclosure is not limited thereto. As such, an element expressed in a plural form may also be configured as a single element, and an element expressed in a singular form may also be configured as plural elements.

Specific embodiments of the present disclosure are described in the descriptions of the present disclosure, but it will be understood that various modifications may be made without departing the scope of the present disclosure. Thus, the scope of the present disclosure is not limited to the embodiments described herein and should be defined by the appended claims and their equivalents.

In other words, it will be apparent to one of ordinary skill in the art that other modifications based on the technical ideas of the present disclosure are feasible. Also, the embodiments may be combined to be implemented, when required. For example, portions of the methods provided by the present disclosure may be combined with each other to enable the BS and the UE to operate. Also, although the embodiments are described based on 5G and NR systems, modifications based on the technical scope of the embodiments may be applied to other communication systems such as LTE, LTE-A, LTE-A-Pro systems, or the like.

Abbreviations

2D Two dimensional
ACK Acknowledgement
AoA Angle of Arrival
AoD Angle of Discharge
ARQ Automatic Repeat Request
BW Bandwidth
CDM Code Division Multiplexing
CP Cyclic Prefix
C-RNTI Cell-Radio Network Temporary Identifier
CRS Common Reference Signal
CRI Channel State Information Reference Signal Resource Indicator
CSI Channel State Information
CSI-RS Channel State Information Reference Signal
CQI Channel Quality Indicator
DCI Downlink Control Information
dB deciBell
DL Downlink
DL-SCH Downlink Shared Channel
DMRS Demodulation Reference Signal
Embb Enhanced mobile broadband
eNB eNodeB (base station)
FDD Frequency Division Duplexing
FDM Frequency Division Multiplexing
FFT Fast Fourier Transform
HARQ Hybrid ARQ
IFFT Inverse Fast Fourier Transform
LAA Licensed Assisted Access
LBT Listen before talk
LTE Long-term Evolution
MIMO Multiple Input Multiple Output
mMTC Massive Machine Type Communication
MTC Machine Type Communication
MU-MIMO Multi-user MIMO
NACK Negative ACKnowledgement
NW Network
OFDM Orthogonal Frequency Division Multiplexing
PBCH Physical Broadcast Channel
PDCCH Physical Downlink Control Channel
PDSCH Physical Downlink Shared Channel
PHY Physical Layer
PRB Physical Resource Block
PMI Precoding Matrix Indicator
PSS Primary Synchronization Signal
PUCCH Physical Uplink Control Channel
PUSCH Physical Uplink Shared Channel
QOS Quality of Service
RAN Radio Access Network
RAT Radio Access Technology
RB Resource Block
RE Resource Element
RI Rank Indicator
RRC Radio Resource Control
RS Reference Signals
RSRP Reference Signal Received Power
SDM Space Division Multiplexing
SINR Signal to Interference & Noise Ratio
SPS Semi-Persistent Scheduling
SRS Sounding RS
SF Subframe
SSS Secondary Synchronization Signal
SU-MIMO Single-User MIMO
TDD Time Division Duplexing
TDM Time Division Multiplexing
TB Transmission Block TP Transmission Point
TTI Transmit Time Interval
UCI Uplink Control Information
UE User Equipment
UL Uplink
UL-SCH UL-Shared Channel
URLL Ultra-Reliable and Low-Latency While the present disclosure is described with various embodiments, various modifications and changes may be proposed to one of ordinary skill in the art. The present disclosure is intended to include the modifications and changes which belong to the scope of claims below.

The invention claimed is:

1. A method comprising:
receiving, from a base station, a radio resource control (RRC) message including a parameter associated with using a start symbol of a physical downlink control channel (PDCCH) monitoring occasion as a reference of a start and length identifier value (SLIV);
in case that a physical downlink shared channel (PDSCH) is scheduled by downlink control information (DCI) transmitted via repetitive first PDCCH candidate and second PDCCH candidate, determining a reference symbol associated with a start symbol of the PDSCH by using the second PDCCH candidate starting after the first PDCCH candidate, based on the parameter; and
receiving, from the base station via the PDSCH, downlink data, based on the reference symbol.

2. The method of claim 1, wherein a value of a slot offset corresponding to the PDSCH is zero.

3. The method of claim 1, wherein a time-domain resource mapping type for the PDSCH is set to Type B.

4. The method of claim 1, wherein the DCI corresponds to DCI format 1_2.

5. The method of claim 1, wherein the determining of the reference symbol comprises determining, as the reference symbol, a start symbol of a monitoring occasion for the second PDCCH candidate.

6. The method of claim 1, wherein the start symbol of the PDSCH is relative to the reference symbol.

7. A user equipment (UE) in a wireless communication system, the UE comprising:
a transceiver; and
at least one processor configured to
receive, via the transceiver from a base station, a radio resource control (RRC) message including a parameter associated with using a start symbol of a physical downlink control channel (PDCCH) monitoring occasion as a reference of a start and length identifier value (SLIV),
in case that a physical downlink shared channel (PDSCH) is scheduled by downlink control information (DCI) transmitted via repetitive first PDCCH candidate and second PDCCH candidate, determine a reference symbol associated with a start symbol of the PDSCH by using the second PDCCH candidate starting after the first PDCCH candidate, based on the parameter, and
receive, from the base station via the PDSCH, downlink data, based on the reference symbol, via the transceiver.

8. The UE of claim 7, wherein a value of a slot offset corresponding to the PDSCH is zero.

9. The UE of claim 7, wherein a time-domain resource mapping type for the PDSCH is set to Type B.

10. The UE of claim 7, wherein the DCI corresponds to DCI format 1_2.

11. The UE of claim 7, wherein the at least one processor is configured to determine, as the reference symbol, a start symbol of a monitoring occasion for the second PDCCH candidate.

12. The UE of claim 7, wherein the start symbol of the PDSCH is relative to the reference symbol.

13. A method performed by a base station in a wireless communication system, the method comprising:
transmitting, to a user equipment (UE), a radio resource control (RRC) message including a parameter associated with using a start symbol of a physical downlink control channel (PDCCH) monitoring occasion as a reference of a start and length identifier value (SLIV);
in case that a physical downlink shared channel (PDSCH) is scheduled by downlink control information (DCI) transmitted via repetitive first PDCCH candidate and second PDCCH candidate, determining a reference symbol associated with a start symbol of the PDSCH by using the second PDCCH candidate starting after the first PDCCH candidate, based on the parameter; and
transmitting, to the UE via the PDSCH, downlink data, based on the reference symbol.

14. The method of claim 13, wherein a value of a slot offset corresponding to the PDSCH is zero.

15. The method of claim 13, wherein a time-domain resource mapping type for the PDSCH is set to Type B.

* * * * *